(12) United States Patent
Kashiwai et al.

(10) Patent No.: US 7,896,043 B2
(45) Date of Patent: *Mar. 1, 2011

(54) VEHICLE WHEEL WITH SUB AIR CHAMBER AND PRESSURE SENSOR

(75) Inventors: Mikio Kashiwai, Saitama (JP); Youichi Kamiyama, Saitama (JP); Hisamitsu Takagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 12/284,114

(22) Filed: Sep. 18, 2008

(65) Prior Publication Data

US 2009/0072611 A1    Mar. 19, 2009

(30) Foreign Application Priority Data

Sep. 19, 2007  (JP) ................. 2007-242896

(51) Int. Cl.
*B60C 19/00* (2006.01)
(52) U.S. Cl. .................... 152/381.6; 301/6.91
(58) Field of Classification Search ........... 152/381.5, 152/381.6, 400, 516, 520, 154.1
See application file for complete search history.

(56) References Cited

U.S. PATENT DOCUMENTS

| 2,440,740 | A * | 5/1948 | Daddio ................... 152/400 |
| 6,557,406 | B2 * | 5/2003 | Gabelmann ............... 73/146.5 |
| 7,188,652 | B2 * | 3/2007 | Yukawa .................... 152/450 |
| 7,328,608 | B2 | 2/2008 | Kashiwai et al. |
| 7,690,410 | B2 * | 4/2010 | Kamiyama et al. ........ 152/381.5 |
| 2006/0038670 | A1 | 2/2006 | Kashiwai et al. |
| 2006/0162436 | A1 * | 7/2006 | Ito et al. ................... 73/146 |
| 2006/0288924 | A1 * | 12/2006 | Katou et al. ............... 116/34 R |
| 2006/0289100 | A1 * | 12/2006 | Fowler-Hawkins ......... 152/450 |
| 2008/0164750 | A1 * | 7/2008 | Vanetta .................... 301/5.21 |
| 2008/0179939 | A1 * | 7/2008 | Kusaka et al. ............. 301/95.104 |
| 2009/0108666 | A1 * | 4/2009 | Kashiwai et al. .......... 301/95.104 |
| 2010/0090520 | A1 * | 4/2010 | Kamiyama et al. ........ 301/95.104 |

FOREIGN PATENT DOCUMENTS

| DE | 196 26 446 A1 | 1/1998 |
| JP | 04-146806 | 5/1992 |
| JP | 7-149122 | 6/1995 |
| JP | 2002-283801 | 10/2002 |
| JP | 2003-252191 | 9/2003 |
| JP | 2003-341316 | 12/2003 |
| JP | 2004-090669 | 3/2004 |
| JP | 2006-056356 | 3/2006 |
| JP | 2006-273182 | 10/2006 |
| JP | 2006-298231 | 11/2006 |

* cited by examiner

*Primary Examiner* — Russell D Stormer
(74) *Attorney, Agent, or Firm* — Carrier Blackman & Associates, P.C.; Joseph P. Carrier; William D. Blackman

(57) ABSTRACT

A wheel body includes a wheel body including a disk and a rim fixed to an outer circumference of the disk for supporting a tire for the vehicle; an air pressure sensor unit for detecting a pressure in an air chamber in the tire with transmitter; a sub air chamber member on the rim for reducing a magnitude of a resonance sound generated by an air column defined by the air chamber defined by the rim and the tire. The air pressure sensor unit and the sub air chamber member are disposed in a circumferential direction of the wheel so as to cancel out one unbalance mass distribution of the vehicle wheel in the circumferential direction of the wheel caused by disposing the air pressure sensor by another unbalance mass distribution of the wheel in the circumferential direction caused by disposing sub air chamber member.

6 Claims, 17 Drawing Sheets

US 7,896,043 B2

VEHICLE WHEEL WITH SUB AIR CHAMBER AND PRESSURE SENSOR

CROSS REFERENCE TO RELATED APPLICATIONS

This application claims the foreign priority benefit under Title 35, United States Code, §119(a)-(d) of Japanese Patent Application No. 2007-242896, filed on Sep. 19, 2007 in the Japan Patent Office, the disclosure of which is herein incorporated by reference in its entirety.

BACKGROUND OF THE INVENTION

1. Field of the Invention

The present invention relates to a structure of a vehicle wheel for holding a tire put on a rim of the vehicle wheel, and particularly to a technology of rotation balance adjustment when a tire pressure sensor for detecting an air pressure in the tire is disposed on the vehicle wheel.

2. Description of the Related Art

A vehicle wheel with an air pressure sensor is known. JP 07-149122 A discloses a vehicle wheel having a pressure sensor for detecting a tire air pressure and a transmitter for transmitting a radio wave signal converted from a signal outputted by the pressure sensor.

Further, JP 2002-283801 A (in FIGS. 1, 4, and 6) discloses a wheel structure in which, to cancel unbalanced mass distribution in a wheel circumferential direction caused by disposing an air pressure sensor, a weight having a mass corresponding to the mass of the air pressure sensor is set on a wheel at a position which is a point symmetry to the air pressure sensor about a rotation center of the wheel, so that a mass of a balance weight afterward attached to the wheel can be made as small as that in the case where the air pressure sensor is not disposed.

SUMMARY OF THE INVENTION

An aspect of the present invention provides a vehicle wheel requiring no counter weight for the air pressure sensor.

Another aspect of the present invention provides a wheel for a vehicle comprising: a wheel body including a disk and a rim fixed to an outer circumference of the disk for supporting a tire for the vehicle; an air pressure sensor having an air pressure sensor for detecting a pressure in an air chamber in the tire to generate a pressure signal and a transmitter for transmitting the pressure signal; a sub air chamber member on the rim for reducing a magnitude of a resonance sound generated by an air column defined by the air chamber defined by the rim and the tire; wherein the air pressure sensor and the sub air chamber member are disposed in a circumferential direction of the wheel so as to cancel out one unbalance mass distribution of the vehicle wheel in the circumferential direction of the wheel caused by disposing the air pressure sensor by another unbalance mass distribution of the wheel in the circumferential direction caused by disposing sub air chamber member.

According to this aspect, the sub air chamber member for providing a sub air chamber may be fixed to the rim at such a location in a circumferential direction of the wheel that an unbalanced mass distribution in the circumferential direction of the wheel caused by the air pressure sensor fixed to the rim is cancelled out. This may reduce increase in weight of the wheel.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing embodiments of the present invention, the above-mentioned related art will be further explained.

In the wheel structure disclosed in JP 2002-283801 A, the corresponding weight serves only as a counter weight, which results in increase in weight and a manufacturing cost of the wheel. The present invention provides a vehicle wheel requiring no counter weight for the air pressure sensor.

First Embodiment

With reference to FIGS. 1 to 8, will be described a first embodiment.

Figure 1:
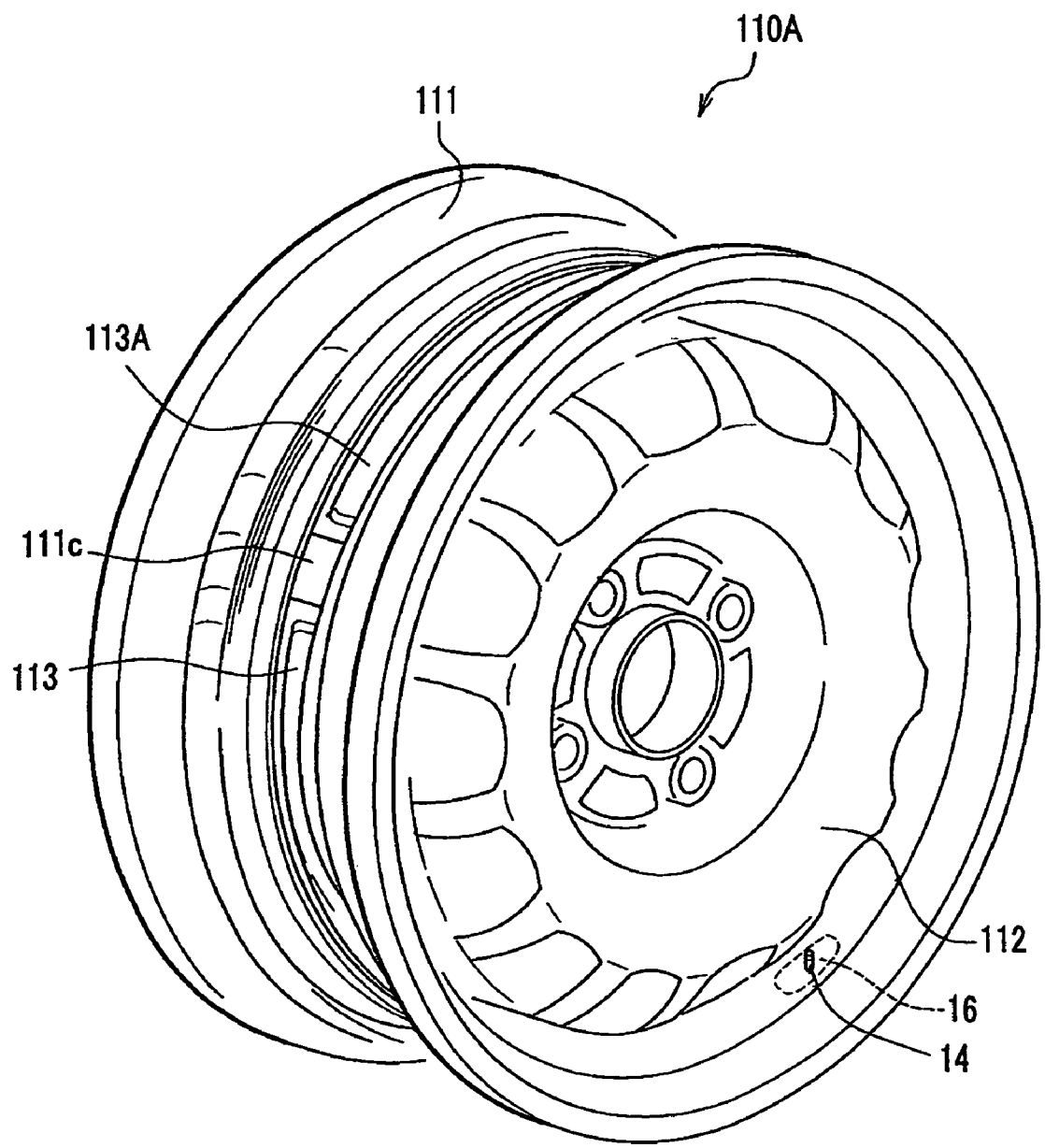
FIG. 1 is a perspective view of a vehicle wheel according to first to eighth embodiments of the present invention.
Figure 2:
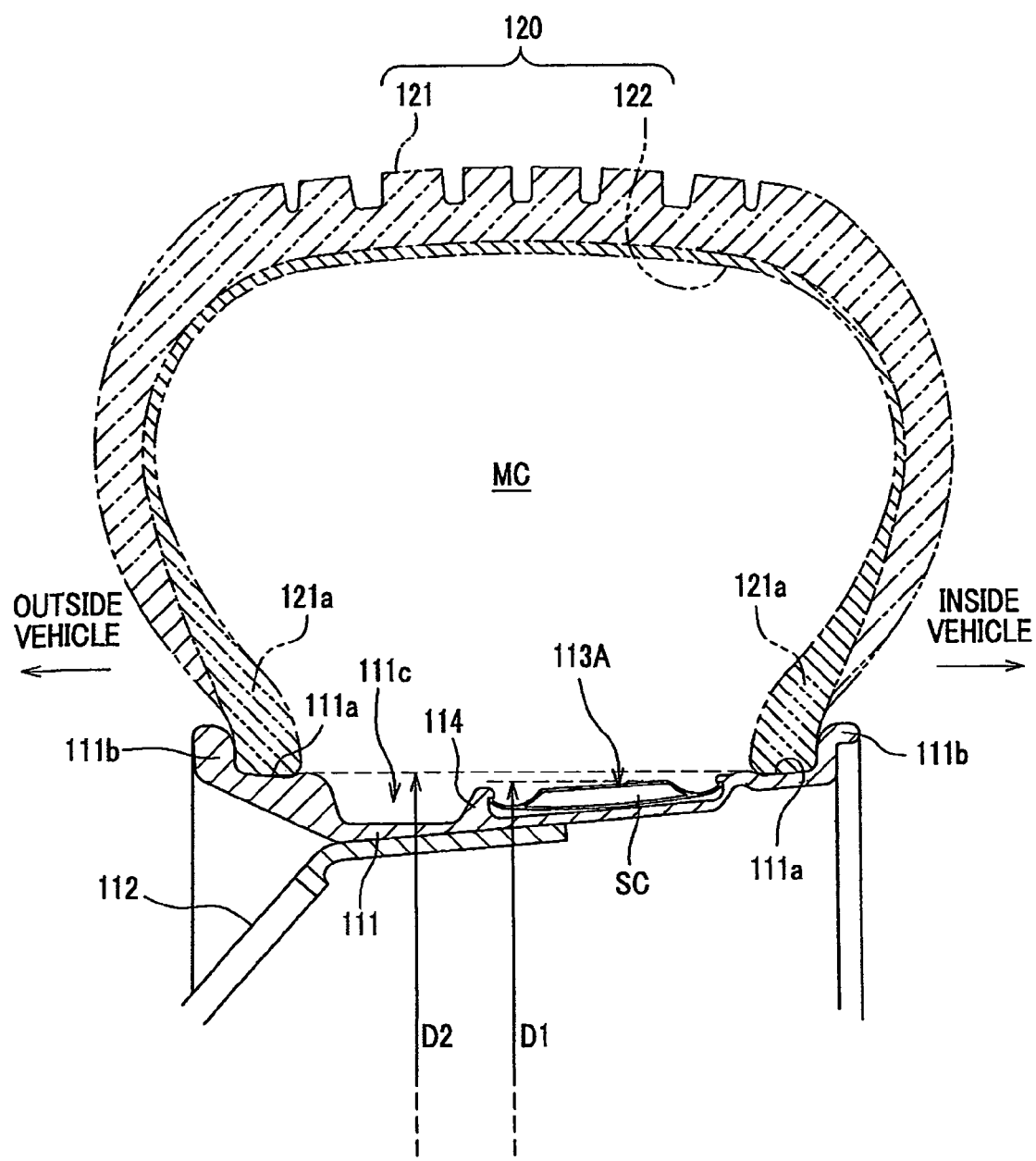
FIG. 2 is a cross section front view of a main part of the vehicle wheel on which a tire is set, and sub air chamber members according to a first embodiment of the present invention are disposed.
Figure 3A:
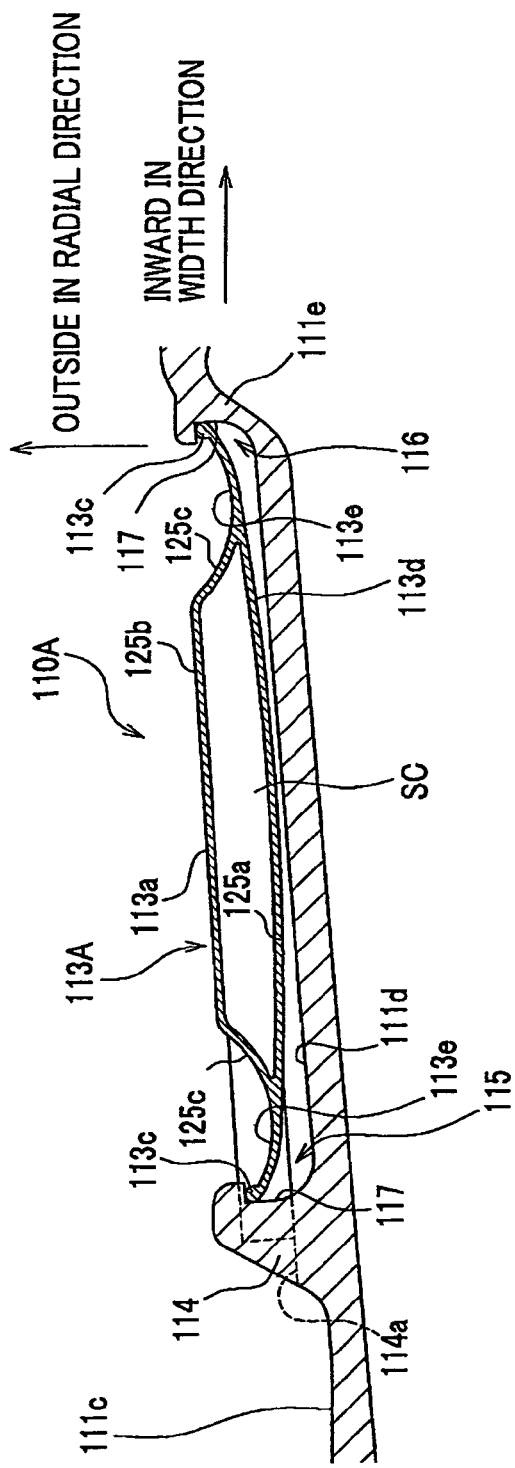
FIG. 3A is an enlarged cross section view of a main part in FIG. 2.
Figure 3B:
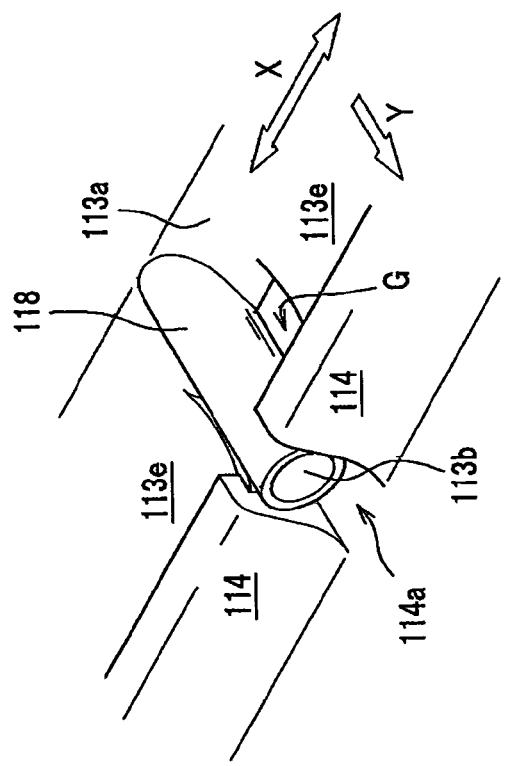
FIG. 3B is a perspective view of a part where a notch is formed in a vertical wall in a well shown in FIG. 3A.

FIG. 1 is a perspective view of a vehicle wheel according to embodiments of the present invention. FIG. 2 is a cross section front view of a main part of the vehicle wheel on which a tire is set, and a sub air chamber member SC according to the first embodiment of the present invention is provided. FIG. 3A is an enlarged cross section view of a main part shown in FIG. 2, and FIG. 3B is a perspective view of a part where a notch is formed in a vertical wall shown in FIG. 3A.

The present invention provides a vehicle wheel 110A with a sensor unit (an air pressure sensor) 16 and the sub air chamber member (Helmholtz resonator) SC in which a static wheel balance is adjusted such that unbalance mass distributions in a circumferential direction of the wheel (angular distribution about a rotation axis of the wheel) 110A of the sensor unit 16 and the sub air chamber members 113A are cancelled. First, will be described the entire structure of the vehicle wheel 110A. After that, will be described the sensor unit 16 and the sub air chamber member 113A.

As shown in FIG. 1, the vehicle wheel 110A includes a rim 111 having a well 111c for holding a tire 120 (see FIG. 2) fit thereto, a disk 112 for connecting the rim to a hub of a vehicle (not shown), and a sub air chamber 113A fixed on an outer circumferential surface (see FIG. 3A) of the well 111c, in which the sensor unit 16 is fixed to the rim 111 in the vicinity of a valve 14 attached to the rim 111.

As shown in FIG. 2, the rim 111 includes bead seats 111a and 111a formed at edges, in a width direction, of the vehicle wheel 110A, rim flanges 111b extending from the bead seats 111a and 111a and being bent outwardly in a radial direction of the vehicle wheel 110A in a form of letter L in cross section, and the well 111c recessed in an inward radial direction of the vehicle wheel 110A between the bead seats 111a and 111a.

The tire 120 is put on the rim 111 with the beads 121a and 121a seated on the bead seats 111a and 111a. This forms a tire air chamber MC which is an air-tight space having a ring shape between an outer circumferential surface 111d and an inner circumferential surface of the tire 120.

The tire 120 includes a tire body 121 and an inner liner 122.

The well 111c is provided to allow the beads 121a and 121a of the tire 120 to fall therein when the tire 120 is put on the rim 111. On the outer circumferential surface 111d of the well 111c is formed a vertical wall 114.

The vertical wall 114 is formed such that a first vertical wall surface 115 extends from the outer circumferential surface 111d of the well 111c outwardly in a radial direction of the vehicle wheel 110A. The vertical wall 114 further extends on the outer circumferential surface 111d in a circumferential direction of the vehicle wheel 110A and forms a ring shape when viewed from the side of the vehicle wheel 110A. On the outer circumferential surface 111d, a side surface part 111e is formed at a location on the well 111c inward in width direction of the wheel 110A (on the side of the vehicle) with a second vertical wall 116 facing the first vertical wall surface 115.

The vertical wall 114 can be formed integrally with the well 111c during casting the rim 111.

These first vertical wall surface 115 and the second vertical wall surface 116 have channels 117, respectively. These channels 117 and 117 provide annular recesses and openings extending along the circumferential direction of the wheel 110A on the outer circumferential surface 111d of the well 111c. The openings face each other. Fitted into these channels 117 and 117 are edge parts 113e of the sub air chamber member 113A.

The channels 117 and 117 are formed by machining the vertical wall 114 and the side surface part 111e.

Formed in the vertical wall 114 is a notch 114a as shown in FIG. 3B. Fitted into the notch 114a is a protruding part (pipe) 118 of the sub air chamber member 113A.

The notch 114a is formed together with the vertical wall 114 by casting the rim 111 or machining the vertical wall 114.

Figure 7A:
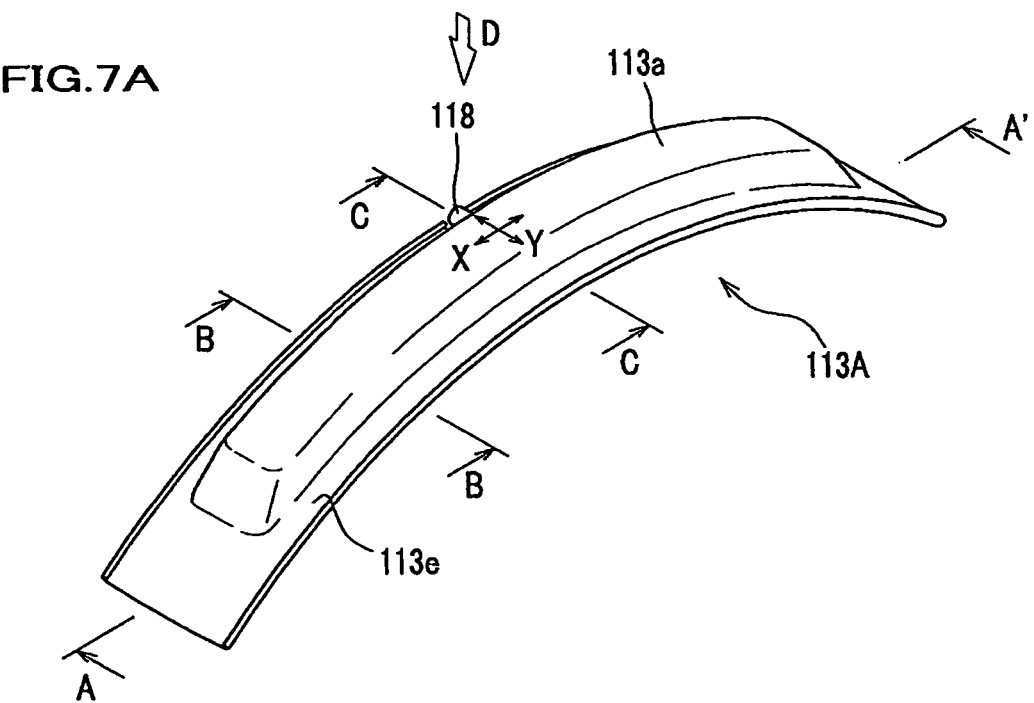
FIG. 7A is a perspective view of the sub air chamber member.
Figure 7B:
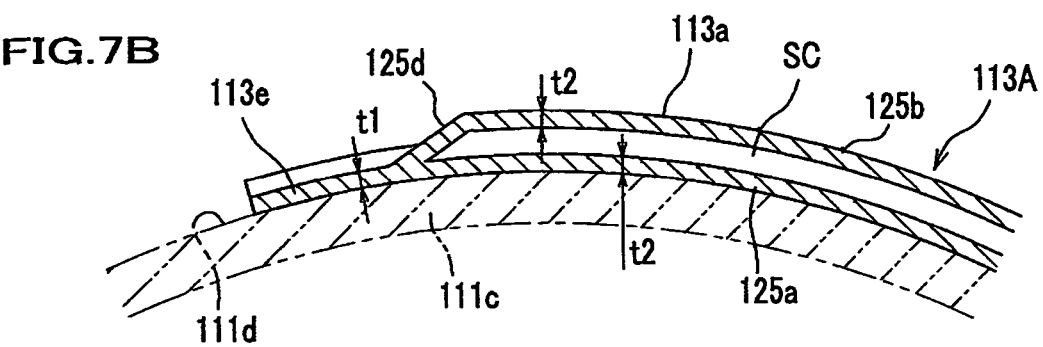
FIG. 7B is a partial cross section view taken along line A-A' in FIG. 7A.

As shown in FIGS. 3A and 7B, a body 113a of the air chamber member 113A is air-tightly formed to provide the sub air chambers SC. The body 113a includes a bottom plate 125a, an upper plate 125b, side plates 125c and 125c at side edges of the sub air chamber member 113A in the width direction of the wheel 110A, and end plates 125d and 125d at ends, in the circumferential direction of the vehicle wheel 110A, of the sub air chamber member 113A (see FIG. 7B).

As shown in FIG. 2, from the edges, in an outside direction of the vehicle, of the rim 111, the disk 112 extends inwardly in the radial direction of the vehicle wheel 110A. The rim 111 and the disk 112 are manufactured, for example, from a light weight high strength material such as an aluminum alloy and a magnesium alloy.

However, the material for the disk 112 is not limited to the aluminum alloy and the magnesium alloy, but may be formed with steel or the like. Further, the vehicle wheel 110A may be a spoke wheel.

Figure 4A:
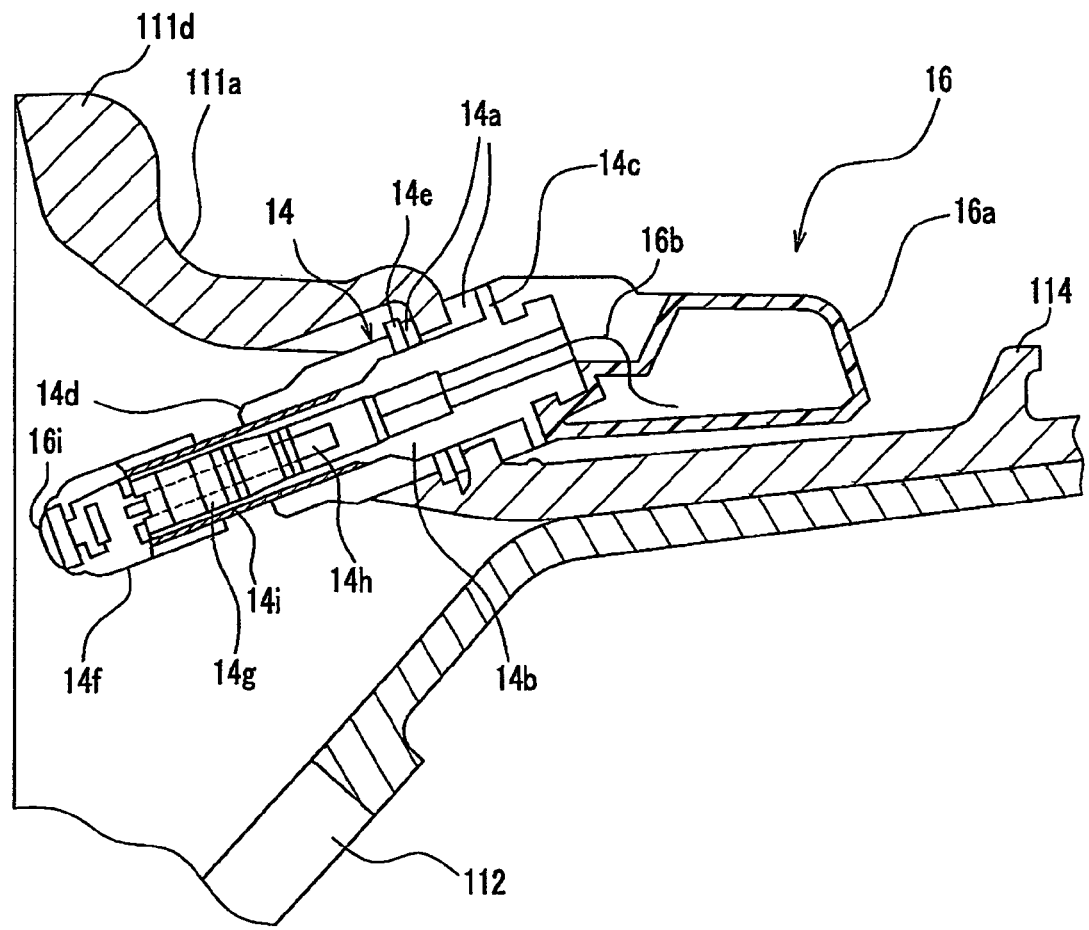
FIG. 4A is an enlarged cross section view of a part in a case where a sensor unit is attached to and held by a valve.
Figure 4B:
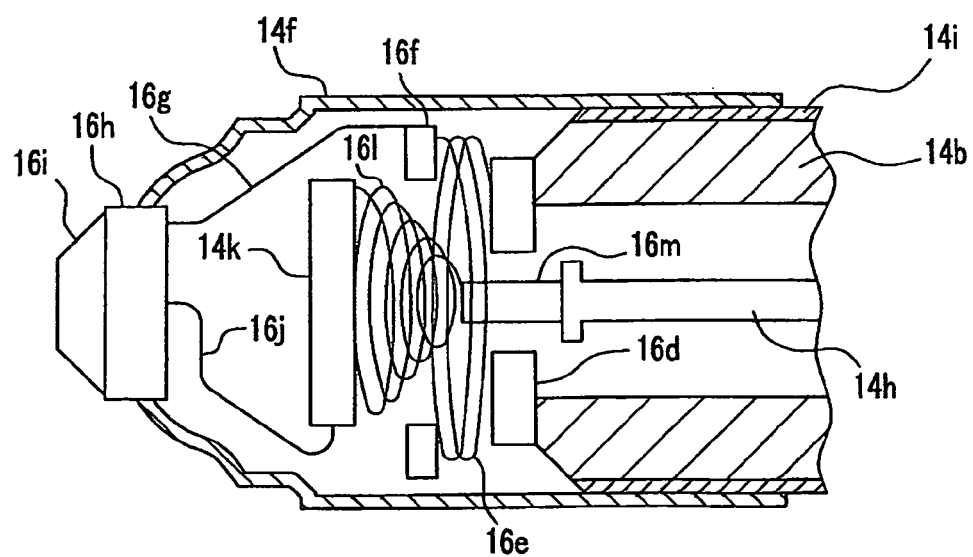
FIG. 4B is an enlarged section view of the sensor unit shown in FIG. 4A around a valve cap.
Figure 5:
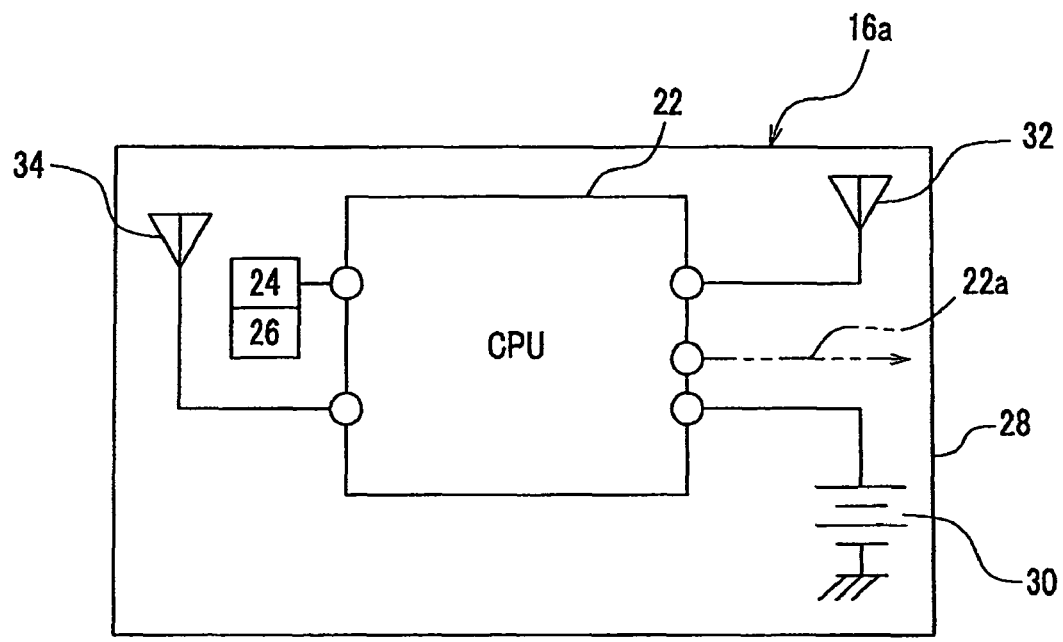
FIG. 5 is a block diagram of the sensor unit according to first to eighth embodiments.

With reference to FIGS. 4 and 5, will be described a method of fixing the sensor unit 16 and a structure of the sensor unit 16. The structure of the sensor unit 16 and a method of fixing the sensor unit 16 are similar to those disclosed in JP 2003-341316 A.

FIG. 4A shows a cross section of a part including the sensor unit 16 set on the valve 14 in the vehicle wheel 110A, and FIG. 4B shows an enlarged cross section of the vicinity of a valve cap 14f of the sensor unit 16. FIG. 5 shows a block diagram of a body 16a of the sensor unit 16.

In FIG. 4A, a valve cap 14f made of metal is attached to a tip side of a stem 14b, i.e., a part which the user can monitor outside the tire. The stem 14b is hollow therein to house a valve core 14g. The valve core 14g is shaped to have an outer wall with plastic and houses therein a metal pin 14h extending in a longitudinal direction thereof toward the valve cap 14f. The pin 14h is connected to a power source 30 through a lead wire 16b.

More specifically, as shown in FIG. 4A, the sensor unit 16 is formed integrally with the valve 14 attached to the rim 111 for charging the air. Inserted between the rim 111 and the valve 14 is a grommet (bush) 14a, and the valve 14 is fixed to the rim 111 with a nut 14d and a washer 14e at a position shown in FIG. 4A using a thread 14i. The valve 14 has a diameter which is expanded inside the rim 111 (diameter-expanded part), and the body 16a of the sensor unit 16 is connected to the diameter-expanded part.

As shown in FIG. 4B, the stem 14b is connected in the cap 14f to a ring electrode chip 16d which is connected to a ring second electrode chip 16f through a metal spring 16e. The second electrode chip 16f is connected to a plug-in type of electrode 16h through a lead 16g. The cap 14f is opened around the electrode 16h to show an LED 16i. As shown in FIG. 14B, the valve cap 14f has an LED (light emitting diode) 16i at an opening end so as to allow a user to monitor the LED 16i outside the tire 120.

The electrode 16h is connected to a fixed electrode 14k through a second lead 16j. The fixed electrode 14k connected to an electrode 16m on an anode side through a metal spring 16l. The electrode 16m is in contact with the pin 14h. This provides an LED emitting circuit from the power source 30 via the lead line 16b, the pin 14h, the electrode 16m, the spring 16l, the electrode 14k, the lead 16j, the electrode 16h (LED 16i), the lead 16g, the electrode chip 16f, the spring 16e, the electrode chip 16d, and the stem 14b.

The body 16a of the sensor unit 16 includes, as shown in FIG. 5, a CPU (central processing unit) 22, a pressure sensor (detecting part) 24 for generating an output indicating an air pressure of the vehicle tire 110A, and a temperature sensor (detecting part) 26 for generating a signal indicating a temperature at the location of the pressure sensor 24. Outputs of the pressure sensor 24 and the temperature sensor 26 are converted into digital signals through an A/D converter (not shown) which are applied to the CPU 22.

The CPU 22 and the pressure sensor 24 and the like are formed integrally on a substrate 28 as a chip.

Disposed inside the body 16a is the power source 30 such as a lithium battery for operating the CPU 22 and the like. The body 16a has a transmission antenna (transmitting part) 32 for transmitting outputs of the pressure sensor 24 and the temperature sensor 26 to an air pressure monitoring unit (not shown) attached inside a cabin of the vehicle and a receiving antenna 34 for receiving a transmission signal from the air pressure monitoring unit.

The air pressure monitoring unit has a monitoring unit body (not shown) disposed on an appropriate location of the vehicle cabin and four receiving antennas (not shown) and four transmission antennas respectively disposed adjacent to the vehicle wheels 110A. The receiving antennas and the transmission antennas for the monitoring unit are connected to the monitoring unit body through coaxial cables.

Further, the monitoring unit has an indicator (not shown) disposed on a dash board in front of the driver's seat of the vehicle body. The indicator is connected to the monitoring unit body through a harness (a set of wire cables), and indicates an error in air pressure at any of vehicle wheel. Further the monitoring unit body transmits to the sensor unit 16 a lighting signal for the LED 16i through the transmission antenna (not shown) of the monitoring unit on side of the vehicle body and the receiving antenna 34 of the sensor unit 16 to generate a signal 22a to turn on the LED 16i on the vehicle wheel 110A with the error in the air pressure.

Figure 6:
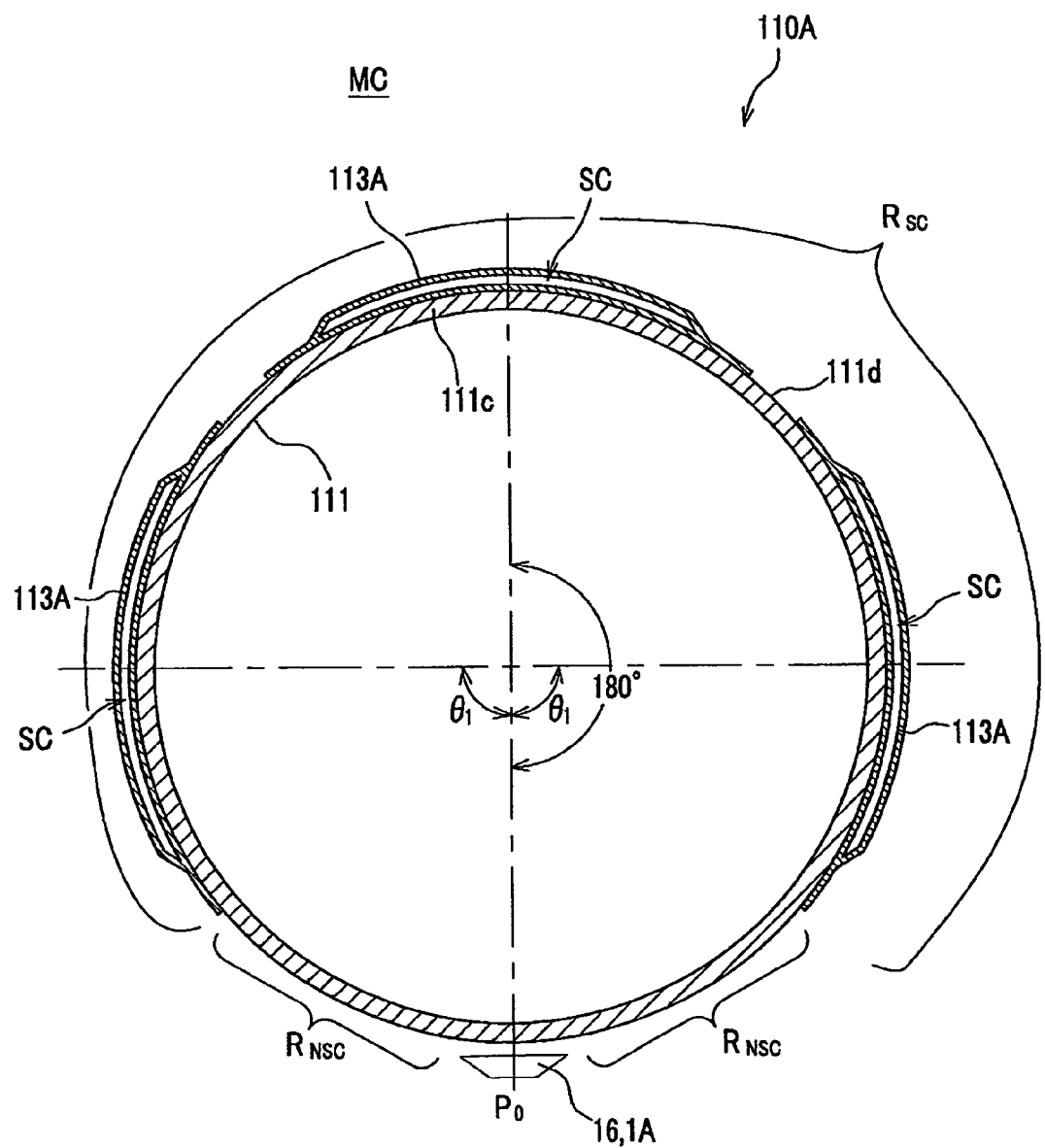
FIG. 6 is a side cross-sectional view of the vehicle wheel to show locations of the sensor unit and the sub air chamber members disposed on the wheel according to the first embodiment.

With reference to FIGS. 6 and 7 will be described the sub air chamber member 113A. FIG. 6 shows a side cross-sectional view of the vehicle wheel 110A to show arrangement of the sensor unit 16 and the sub air chamber member 113A. FIG. 7A shows a perspective view of the sub air chamber member 113A, FIG. 7B shows a partial cross section taken along line A-A' on the side of A in FIG. 7A, FIG. 7C shows a cross section taken along line C-C in FIG. 7A, and FIG. 7D is a partial plan view in which the protrusion part 118 is shown in a direction D in FIG. 7A.

The sub air chamber member 113A is, as shown in FIG. 6, a member which is long and disposed in a circumferential direction of the vehicle wheel 110A on the outer circumferential surface 111d of the well 111c to provide the sub air chamber SC therein. The sub air chambers 113A are disposed on the outer circumferential surface 111d of the well 111c as follows:

Two sub air chambers 113A are disposed at the same angle $\theta_1$ (90° in FIG. 6) in clockwise and counter clockwise direction from a position $P_0$ in a circumferential direction of the vehicle wheel 110A as a reference point where the sensor unit 16 is disposed (the valve 14 is disposed) about a wheel center axis. A third sub air chamber is disposed so as to locate a center of the sub air chamber member 113A in the circumferential direction of the vehicle wheel 110A at a location 180° apart from the position $P_0$.

The angle $\theta_1$ is determined to obtain a static balance of the vehicle wheel 110A so as to cancel out an unbalance mass distribution over the vehicle wheel 110A in the circumferential direction due to disposing the sensor unit 16 at the location of the valve 14 by another unbalance mass distribution of the entire vehicle wheel 110A in the circumferential direction of the vehicle wheel 110A due to disposing three sub air chamber members 113A.

A region $R_{SC}$ indicates a range of disposing the sub air chamber members 113A in the circumferential direction of the vehicle wheel 110A and regions $R_{NSC}$ indicate ranges in the circumferential direction where no sub air chamber member 113A is disposed.

The sub air chamber members 113A are, as shown in FIGS. 7A and 7B, bent in a longitudinal direction thereof along the outer circumferential surface 111d of the well 111c.

The sub air chamber member 113A includes the body 113a in which the sub air chamber SC is formed between the bottom plate 125a and the upper plate 125b and edge parts 113e outwardly extending from the body 113a. The edge part 113e is also provided both in the circumferential direction of the vehicle wheel 110A and the width direction of the vehicle wheel from the body 113a. The edge part 113e has the same thickness t1 as a thickness t2 of the bottom plate 125a and the upper plate 125b of the body 113a. The edge part 113e has the edges 113c in the width direction of the vehicle wheel, the edge 113c having a thickness greater than the thickness $t_1$ and extends in the circumferential direction of the vehicle wheel 110A with a circle section.

Figure 7C:
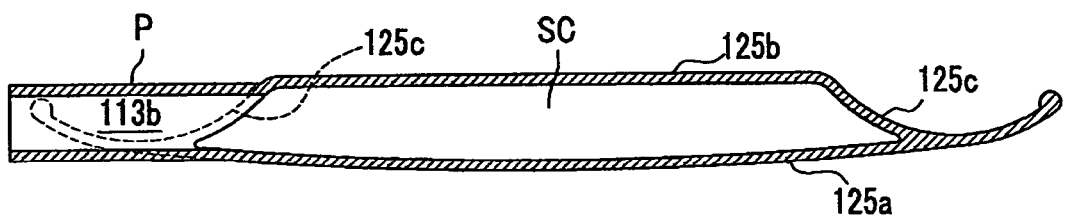
FIG. 7C is a partial cross section view taken along line C-C' in FIG. 7A.

As shown in FIGS. 7B and 7C, the end plates 125d disposed at ends, in the circumferential direction of the vehicle wheel 110A, of the sub air chamber SC are formed slantwise at ends of the sub air chamber members 113A in the circumferential direction of the vehicle wheel 110A. Similarly, the side plates 125c at end in the width direction of the vehicle wheel 110A are formed slantwise in the width direction of the vehicle wheel 110A.

Further, the end parts 113e in the first embodiment has a predetermined spring constant by suitably determining the thickness $t_1$ and a material.

Referring the section view of FIG. 3A corresponding to the section view taken along line B-B in FIG. 7A, the sub air chamber member 113A is fitted between the first vertical wall surface 115 and the second wall surface 116 to be fixed on the outer circumferential surface 111d of the well 111c. More specifically, the edge part 113e extends toward the first vertical wall surface 115 and the second vertical wall surface 116 to be fitted into the channel 117 and extends in the circumferential direction of the vehicle wheel 110A along the outer circumferential surface 111d of the well from the body 113a.

Further, the edge part 113e extends from the body 113a toward first vertical wall surface 115 and the second vertical wall surface 116 to have the edges 113c and 113c which are fitted into the channels 117 are, as shown in FIG. 3A, so that the sub air chamber member 113A is fixed by the first vertical wall surface 115 and the second vertical wall surface 116.

As shown in FIG. 3A, the bottom plate 125a which is a part of the body 113a on the side of the outer circumferential surface 111d and the end part 113e extending from the bottom plate 125a are integrally curved such that the sub air chamber member 113A is formed to be protrude toward the outer circumferential surface 111d of the well 111c between the both edges 113c and 113c.

When a centrifugal force due to rotation of the vehicle wheel 110A acts on the sub air chamber 113A as described later, the curve part 113d bend in such a direction that the curve parts 113d protrude outwardly in the radial direction of the vehicle wheel 110A. This increases pressure forces on the both edges 113c and 113c contacting the first vertical wall surface 115 and the second vertical wall surface 116. Thus, the sub air chamber member 113A is firmly fixed to the vehicle wheel 110A as increase in the centrifugal force as mentioned later.

Figure 7D:
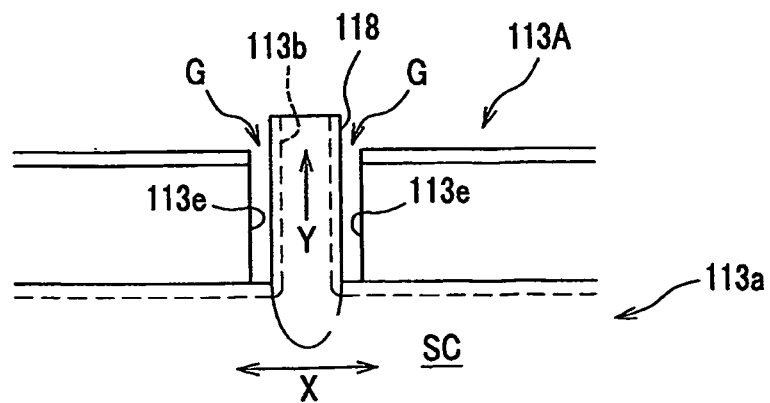
FIG. 7D is partial plan view of a protrusion of the sub air chamber member viewed from a direction D in FIG. 7A.

Further as shown in FIGS. 7A and 7D, the sub air chamber member 113A has the protrusion part 118 protruding from the body 113a in a direction Y orthogonal to a rotation direction X of the vehicle wheel.

In addition, as shown in FIG. 7D, gaps G are formed between the protrusion part 118 and the edge parts 113e.

As shown in FIG. 3B, the protrusion part 118 extends to a side of the vertical wall 114 and is fitted into the notch 114a formed in the vertical wall 114.

The gaps G and G are provided to allow the edge parts 113e to be deformed, while the protrusion part 118 is fitted into the notch 114a, in order to assist the edge parts 113e fitting into the channel 117 of the first vertical wall surface 115 (see FIG. 3A).

The protrusion part 118 comprises a pipe P having a communication through hole therein for providing communication between the sub air chamber SC and the tire air chamber MC (see FIG. 2).

A shape of the sub air chamber SC formed in the sub air chamber member 113A is not limited. However, a flat shape in a cross section is preferable. Thus, the sub air chamber SC according to the first embodiment has, as shown in FIG. 3A, a substantially rectangular of which dimension in the radial direction at the well 111c is shorter (thinner) than that in the width direction.

In the first embodiment, in the sub air chamber member 113A, a maximum radius D1 from the wheel center axis to an outer surface of the sub air chamber member 113A in the wheel radial direction is set to be shorter than a radius D2 from the wheel center axis to the bead seat parts 111a. This facilitates putting the tire 120 on the vehicle wheel 110A.

Preferably, a volume of the sub air chamber SC is approximately from 50 to 250 cc. Setting the volume of the sub air chamber SC within this range (approximately from 50 to 250 cc) allows the sub air chamber member 113A to provide a sufficient noise reduction effect with suppression of increase in weight, which provides reduction in weight of the vehicle wheel 110A.

A total length of the sub air chamber members 113A in the circumferential direction of the vehicle wheel 110A can be appropriately determined in consideration of a mass distribution adjustment and easiness in assembling the sub air chamber members 113A into the well 111c, wherein a circumferential length of the rim 111 is a maximum total length of the sub air chamber members 113A.

A cross sectional shape of the communication through hole 113b is not limited. In the first embodiment, the cross sectional shape is a circle, but may be any of an oval, a polygon, or a half circle. If the cross sectional shape is a circle, it is preferable that a diameter of the circle is equal to or greater than 5 mm. If the cross sectional shape of the communication through hole 113b is other than the circle, it is preferable that the cross sectional area is that of the circle having a diameter equal to or greater than 5 mm.

A length of the communication through hole 113b is determined to satisfy Eq. (1) which determines a resonance frequency of a Helmholtz resonator.

$$f0 = C/2\pi \times \sqrt{(S/V(L+\alpha \times \sqrt{S}))} \quad (1)$$

where f0(Hz): resonance frequency;
C(m/s): a sound velocity in the sub air chamber (=sound velocity in the tire air chamber MC);
V(m$^3$): a volume of the sub air chamber SC;
L(m): a length of the communication through hole 113b;
S(m$^2$): a cross sectional area of an opening of the communication through hole 113b; and
α: a correction coefficient.

The resonance frequency f0 can be adjusted to that of the tire air chamber MC. In this process, all resonance frequencies f0 of three sub air chamber members 113A shown in FIG. 6 can be set to the same value or different values. More specifically, if the tire air chambers MC has two resonance frequencies f1 and f2, the resonance frequency f0 of three sub air chamber members 113A can be set to be (f1+f2)/2.

Further, the resonance frequencies f0 of a pair of sub air chamber members 113A opposite each other about the wheel center axis can be set to a frequency f1 and a resonance frequency f0 of the other sub air chamber 113A can be set to be the frequency f2. In addition, a reverse setting is possible.

A material of the sub air chambers 113A is a general material used for industrial products such as metal, plastic, and rubber. Further, in consideration of reduction in weight, increase in mass productivity, reduction in manufacturing cost in the sub air chamber member 113A, and keeping air-tightening the sub air chamber SC, a material having a light weight and high stiffness and allowing a blow molding is preferable. Particularly, polypropylene is preferable because of high resistance to repeated bending fatigue. In the first embodiment, the sub air chamber member 113A is formed by blow molding.

Figure 8A:
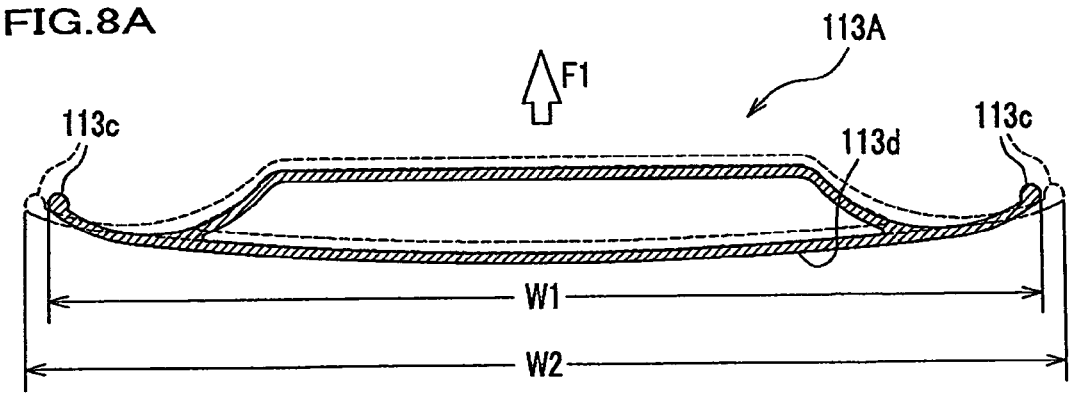
FIG. 8A is a cross section view of the sub air chamber member, taken along line B-B' in FIG. 7A, to show a behavior thereof when a centrifugal force acts thereon.
Figure 8B:
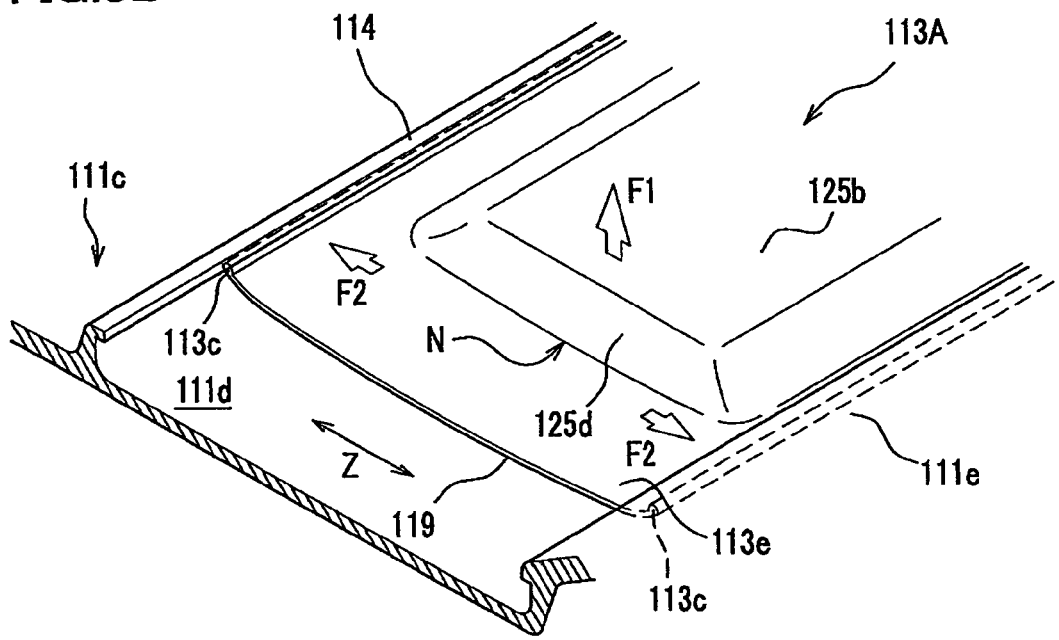
FIG. 8B is a partial perspective view of the sub air chamber member to show the behavior thereof when the centrifugal force acts thereon.
Figure 8C:
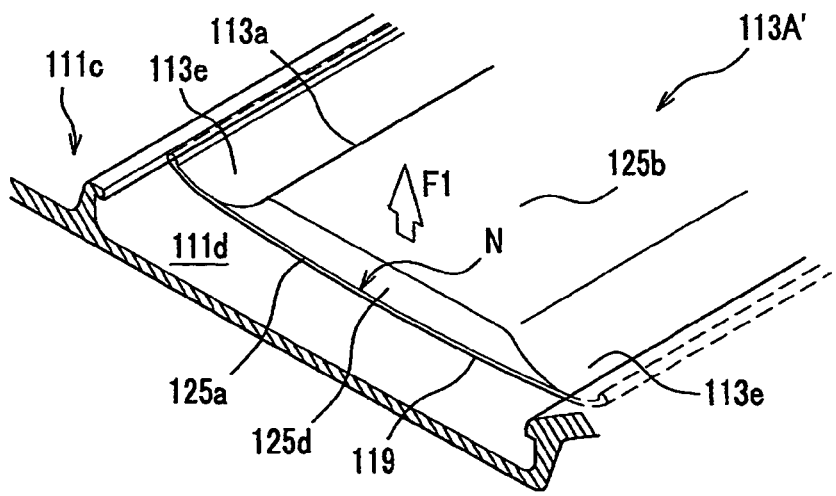
FIG. 8C is a partial perspective view of the sub air chamber member of a comparison example to show the behavior thereof when a centrifugal force acts thereon.

With reference to FIGS. 3, 7A-7D, and 8A-8C, will be described operation of the vehicle wheel 110A. FIG. 8A shows a cross section view taken along line B-B in FIG. 7A for showing a behavior of the sub air chamber 113A. FIG. 8B is a partial perspective view for showing behavior of the sub air chamber 113A to which a centrifugal force applied. FIG. 8C is a partial perspective view for showing behavior of a comparison example of the sub air chamber 113A' considered by the inventors to which a centrifugal force applied.

The vehicle wheel 110A is manufactured only by fitting the sub air chamber members 113A into the rim 111 (well 111c)

unlike in a prior art disclosed in JP 2004-90669 A, in which the sub air chambers are formed by successively connecting a plurality of partition walls or lid members precisely, and connected members are assembled into a rim of a conventional vehicle wheel. Thus, the vehicle wheel 110A can decrease the number of processes and a manufacturing cost compared with the prior art wheel disclosed in JP 2004-90669 A. Further, the vehicle wheel 110A provides a stable noise reduction because no special attention is unnecessary for keeping air tightness of the sub air chambers SC unlike the prior art vehicle wheel disclosed in JP 2004-90669 A.

In the vehicle wheel 110A because the resonance frequency of the sub air chamber member 113A can be checked and corrected before the sub air chamber members 113A are fitted into the rim 111, the number of defective products of the vehicle wheel 110A can be decreased.

As mentioned above, in the vehicle wheel 110A, to fix the sub air chamber members 113A to the rim 111 (well 111c), as shown in FIG. 3A, both edges 113c and 113c of the sub air chamber member 113A are fitted into channels 117 formed in the first vertical wall surface 115 and the second vertical wall surface 116. In this process, because the edge parts 113e have a sufficient spring elasticity (spring constant), the sub air chamber member 113A is easily fixed to the rim between the first vertical wall surface 115 and the second vertical wall surface 116.

Further, in this vehicle wheel 110A, because, as shown in FIG. 3B, the protrusion part 118 of the sub air chamber member 113A which protrudes in a direction Y orthogonal with a rotation direction X of the wheel 110A is fitted into the notch 114a, a movement of the sub air chamber members 113A are surely prevented in the rotation direction X when the vehicle wheel 110A rotates.

Formed inside the protrusion part 118 is the communication through hole 113b. This eliminates necessity of a part for forming the communication through hole in addition to the protrusion part 118. Thus, the vehicle wheel 110A is lightened in weight because the vehicle wheel 110A is simplified in structure.

Further, in the vehicle wheel 110A, when a centrifugal force is applied to the sub air chamber member 113A due to rotation, the curve part 113d which protruded toward the outer circumferential surface 111d of the rim 111 before rotation begins to reversely protrudes outwardly in the radial direction of the vehicle wheel.

As shown in FIG. 8A, when a centrifugal force F1 is applied to the curve part 113d which protrudes in a direction opposite to a direction of the centrifugal force F1 (centrifugal direction), that is, to the sub air chamber 113A having the curve part 113d which protrudes toward the outer circumferential surface 111d shown in FIG. 3A, the sub air chamber member 113A of which both edges 113c and 113c are restricted in movement in the centrifugal direction by the channels 117 expands at the curve part 113d in the width direction Z of the vehicle wheel in the width direction because the curve part 113d is reversely bent, i.e., bent outward in the radial direction of the vehicle wheel 110A. As a result, a span W2 between both edges 113c and 113c in the sub air chamber member 113A (denoted by broken lines) to which the centrifugal force F1 is applied, is greater than a span W1 between both edges 113c and 113c in the sub air chamber member 113A before the centrifugal force F1 is applied.

Next, as shown in FIG. 8B, both edges 113c and 113c, which are restricted in movement in the width direction Z of the vehicle wheel 110A at the well 111c by the vertical wall 114 and the side part 111e, increases a pressing force F2 on the vertical wall 114 and the side part 111e. In other words, in the vehicle wheel 110A, pressing forces F2 on the first veridical wall surface 115 and the second vertical wall surface 116 by the both edges 113c and 113c increase, so that the sub air chamber member 113A is further securely fixed to the well 111c.

In addition, in the vehicle wheel 110A, as shown in FIG. 8B, when the centrifugal force F1 is applied to the sub air chamber member 113A, it is prevented that circumferential edge parts 119 are lifted from the outer circumferential surface 111d of the well 111c. Here the comparison example of the sub air chamber member 113A' is considered for explanation as shown in FIG. 8C where the edge part 113e does not extend in the circumferential direction of the vehicle wheel 110A, and thus, the end plate 125d has an edge extending along a direction normal to the circumferential direction of the vehicle wheel 110A. The bottom plate 125a, side plate 125c, and upper plate 125b are located in the vicinity of circumferential edge part 119 (centrifugal force concentrated location N) to which the centrifugal force is concentrated. As a result, the circumferential edge part 119 is lifted from the outer circumferential surface 111d of the well 111c when the centrifugal force F1 is applied to the sub air chamber member 113A', and a stress in the edge part 113e around the circumferential edge part 119 increases.

On the other hand in the sub air chamber member 113A, as shown in FIG. 8B, the end plate 125d is disposed slantwise at an edge in circumferential direction of the vehicle wheel 110A, and the edge parts 113e extend from the body 113a along the outer circumferential surface 111d of the well 111c in the circumferential direction of the vehicle wheel 110A. Thus, the edge parts 113e extending in the circumferential direction of the vehicle wheel 110A are fixed by the vertical wall 114 and the side part 111e. As a result, the centrifugal force concentrated location N is apart from the circumferential edge part 119, and the extended edge part 113e is also fixed by the vertical wall 114 and the side part 111e, so that fixing parts for fixing against the centrifugal force are dispersed around the centrifugal force concentrated location N. This prevents the circumferential edge part 119 from being lifted by the centrifugal force F1 from the outer circumferential surface 111d of the well 111c. In other words, stress in the edge part 113e around the circumferential edge part 119 is reduced, so that fatigue in the edge part is reduced.

Further, as mentioned earlier, because the thickness t1 of the extending edge parts 113e is made equal to the thickness t2 of the bottom plate 125a and the upper plate 125b of the body 113a (see FIG. 7B), the edge part 113e which is edge in the circumferential direction has a mass in a unit area has a smaller mass than the body 113a, which surely prevents the circumferential end 119 from being lifted.

Further, in the vehicle wheel 110A, as shown in FIG. 2, the maximum diameter D1 passing through the wheel central axis to the outmost side in the radial direction of the vehicle wheel is determined to be smaller than the diameter D2 passing through the wheel central axis to the bead seat parts 111a. This decreases a possibility in that a tool such as a lever or a tire 120 (beads 121a or the like) contacts the sub air chamber member 113A. As a result, a performance of putting the tire 120 increases.

Further, in the vehicle wheel 110A, the sub air chamber SC has a flat shape in cross section, which suppresses the maximum diameter D1 passing through the central axis of the vehicle wheel 110A with a sufficient predetermined volume of the sub air chamber SC being kept.

Further, according to the first embodiment, unbalance mass distribution in the circumferential direction of the vehicle wheel 110A caused by the body 16a of the sensor unit 16 held by the rim 111 through the valve 14 is cancelled out by unbalanced mass distribution in the circumferential direction of the vehicle wheel caused by the sub air chamber members 113A fixed to the outer circumferential surface of the well 111. This eliminates necessity of a discrete counter weight for the sensor unit 16, so that a weight of the vehicle wheel 110A having the sensor unit 16 and the sub air chamber members 113A is decreased.

The present invention is not limited to the first embodiment, but may be modified.

Second Embodiment

The second embodiment is provided by modifying the structure according to the first embodiment. The same parts are designated with the same references as those in the first embodiment, and thus a duplicated description will be omitted.

In the first embodiment, the vertical wall surface 116 is formed at the side surface part 111. In the second embodiment, the second vertical wall surface 116 is formed at other rising surface part in the well 111c.

Figure 9:
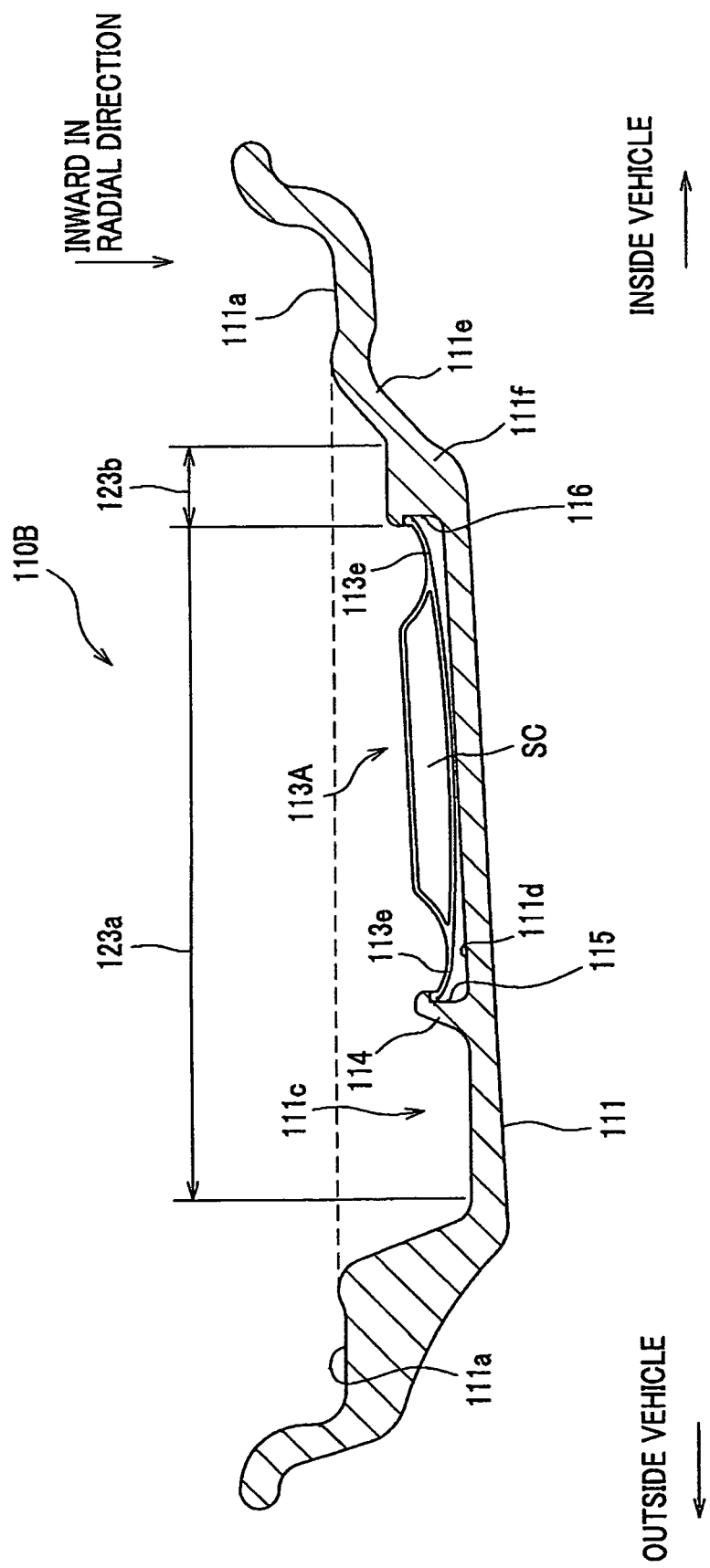
FIG. 9 is a cross section view of the vehicle wheel according to a second embodiment.

FIG. 9 is a section view of a rim of a vehicle wheel 110B according to the second embodiment.

As shown in FIG. 9, the well 111c of the rim 111 in the vehicle wheel 110B includes a small diameter part 123a, and a large diameter part 123b connected to the small diameter part through a step 111f.

In this rim 111, one of the bead seats 111a is formed inward in the direction of the vehicle, i.e., outward in the wheel width direction, from the large diameter part 123b via the side surface part 111e of the well 111c. More specifically, the sub-air chamber member 113A of the second embodiment is fitted at one of the edge parts 113e at a location of the step 111f more inward in the radial direction of the vehicle wheel 110B than the sub air chamber 113A according to the first embodiment (see FIG. 3A).

Accordingly, in the vehicle wheel 110B according to the second embodiment, the outer circumferential surface 111d of the well 111c fixing the sub air chamber membrane 113A is formed more inward in the radial direction of the vehicle wheel 110B than the vehicle wheel 110A according to the first embodiment.

As a result, the vehicle wheel 110B according to the second embodiment can be further lightened in weight because the outer circumferential surface 111d of the well 111c is shorter than the vehicle wheel 110A. Further, in the vehicle wheel 110B, the sub air chamber members 113A are shifted more inward in the radial direction from the bead seats 111a than that in that of the first embodiment.

In the first and second embodiments, three sub air chamber members 113A are disposed to have a static balance with the sensor unit 16. However, the number of the sub air chamber members 113A may be two or less.

Third Embodiment

Figure 10:
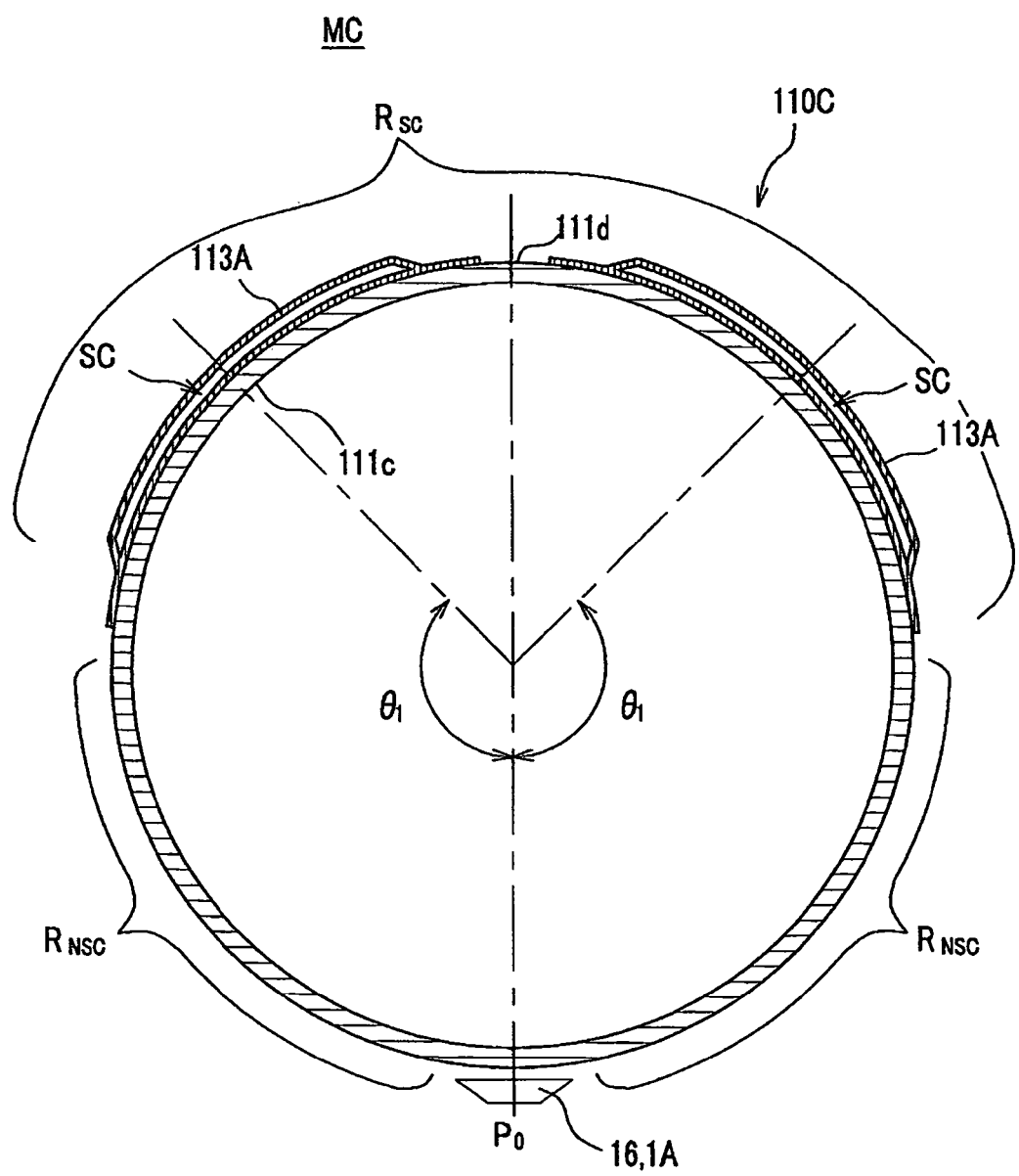
FIG. 10 is a side cross-sectional view of the vehicle wheel according to a third embodiment in which a sensor unit and the sub air chamber members are modified in disposition.

FIG. 10 is a side cross-sectional view of the vehicle wheel according to a third embodiment in an arrangement of the sub air chamber members 113A is modified.

In the vehicle wheel 110C shown in FIG. 10, two sub air chamber members 113A are disposed such that centers in the circumferential direction of the sub air chamber members 113A are at locations apart at the same angle $\theta_1$ (for example, 120° in FIG. 10) from the reference point $P_0$ in the circumferential direction of the vehicle wheel 110C where the sensor unit 16 is disposed.

The angle $\theta_1$ is determined such that unbalance mass distribution caused by disposing the sensor unit 16 at the valve 14 is cancelled out by another unbalance mass distribution in the circumferential direction caused by disposing two sub air chamber members 113A to have a static balance in the vehicle wheel 110C. In FIG. 10, a region $R_{SC}$ indicates a region in the circumferential direction of the vehicle wheel 110C where the sub air chamber members 113A are disposed. Regions $R_{NSC}$ indicate regions in the circumferential direction of the vehicle wheel 110C where the sub air chamber members 113A are not disposed.

Fourth Embodiment

Figure 11A:
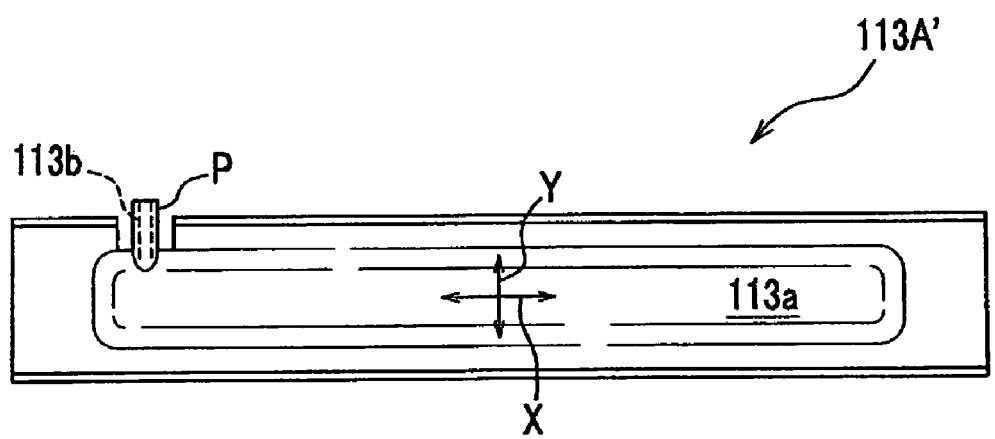
FIGS. 11A and 11B are plan views of the sub air chamber member showing a location of a communication through hole in the sub air chamber member according to a fourth embodiment.
Figure 11B:
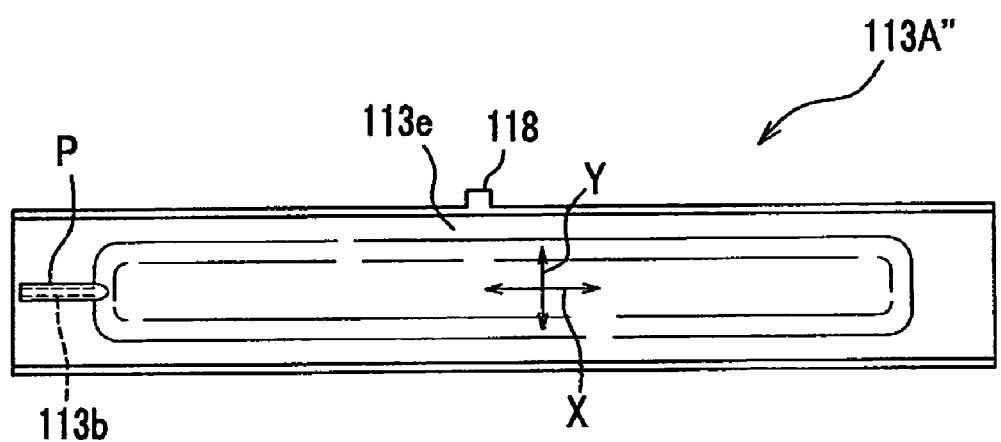

In the first to third embodiments, the communication through holes 113b are disposed at the middle in the longitudinal direction of the sub air chamber members 113A. However, the location of the communication through holes 113b are not limited to this, but may be modified as long as the location does not adverse influence on putting the tire 120 on the rim. FIGS. 11A and 11B are plan views of the sub air chamber members to show locations of the communication through holes 113b.

The sub air chamber member 113A' in FIG. 11A includes a pipe P having a communication through hole 113b therein. The pipe P, which is fitted into the notch 114a (see FIG. 3B) formed in the vertical wall 114 (see FIG. 3B), also serves as a stopper for preventing the sub air chambers 113B from rotating. The pipe P protrudes from the body 113a at an edge in a longitudinal direction of the sub air chamber member 113A' in a direction Y orthogonal with the rotation direction X of the vehicle wheel.

In a sub air chamber member 113A" shown in FIG. 11B, the pipe P having the communication through hole 113b protrudes from the body 113A in the rotation direction X of the vehicle wheel at an edge in the longitudinal direction of the sub air chamber member 113A". The protrusion part 118 protrudes from the edge part 113e in a direction Y orthogonal with the rotation direction X of the vehicle wheel and is fitted into the notch 114 (see FIG. 3B) formed in the vertical wall 114a.

As mentioned above, according to the first to fourth embodiments, the unbalance mass distribution over the vehicle wheels 110A, 110B, or 110C caused by the body 16a of the sensor 16 held by the rim 111 with the valve 14 is cancelled out by the unbalance mass distribution caused by the sub air chamber material 113A, 113A', or 113A". This eliminates the necessity of a counter weight to the sensor unit 16 as a discrete member, so that a weight of the vehicle wheel having the sensor unit and the sub air chamber member can be reduced.

Fifth Embodiment

Figure 12A:
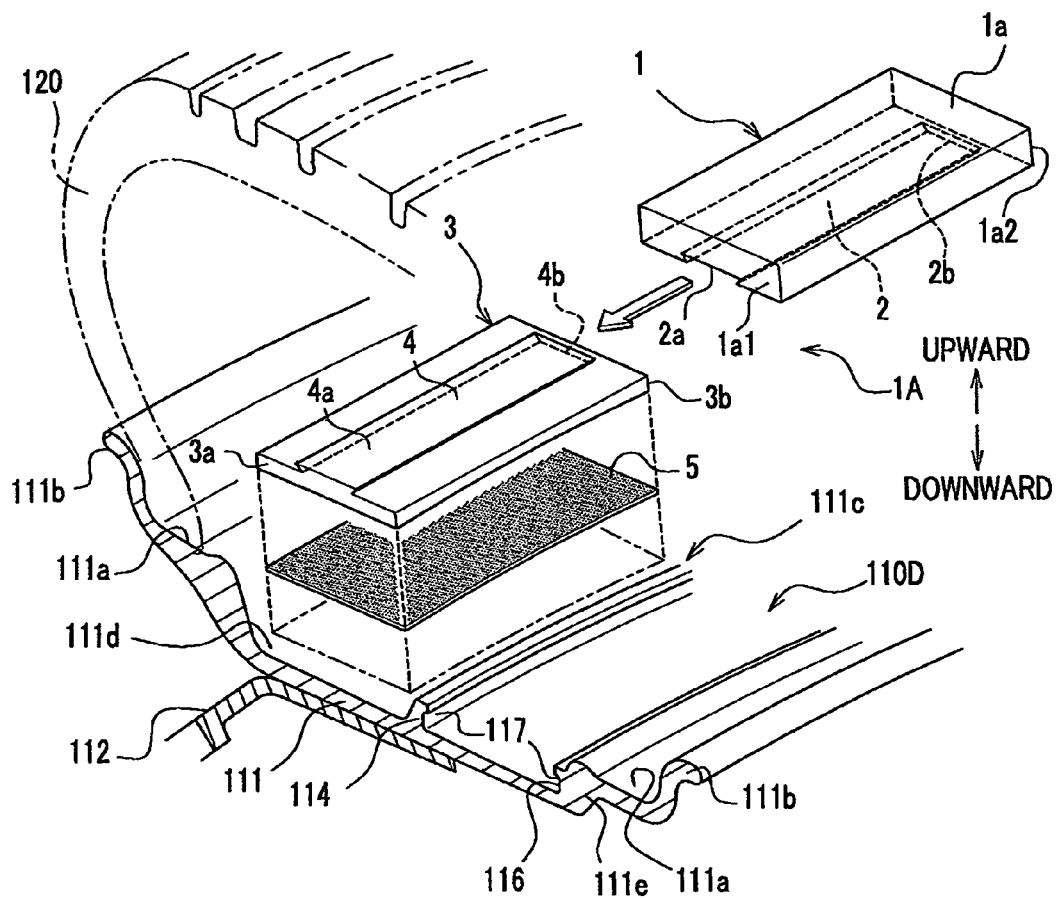
FIG. 12A is an exploded perspective view showing a condition before the sensor unit is mounted in the wheel according to a fifth embodiment.
Figure 12B:
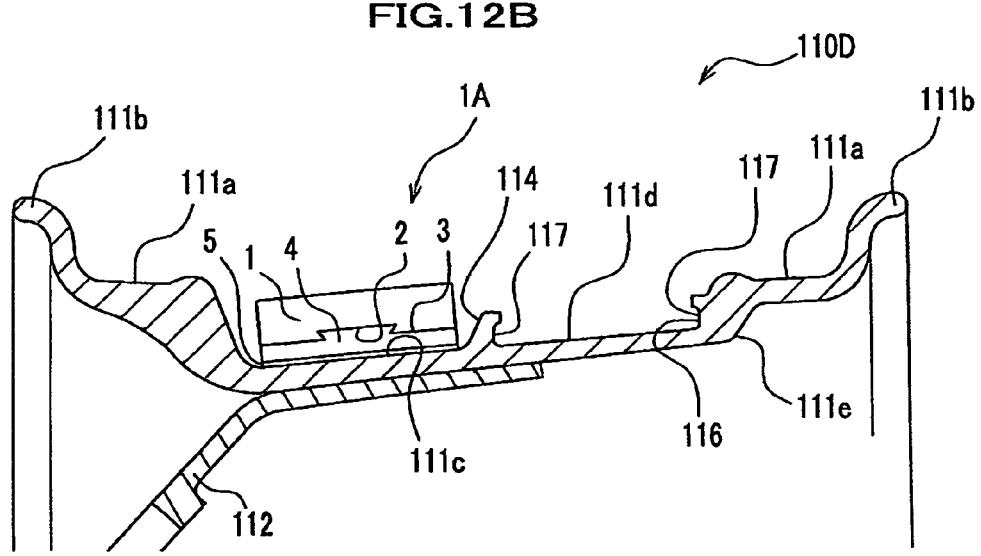
FIG. 12B is a cross section view of the wheel to show a condition after the sensor unit is fixed.

With reference to FIGS. 12A and 12B (occasionally FIGS. 5, 6, and 10) will be described a vehicle wheel according to a fifth embodiment. FIG. 12A is an exploded perspective view of a vehicle wheel according to the fifth embodiment before the sensor unit 16 is attached. FIG. 12B is a partial cross-sectional view of the vehicle wheel according to the fifth embodiment after the sensor unit is attached.

A structure in the fifth embodiment is substantially the same as those in the first to fourth embodiments. The difference is in an exterior shape of the sensor unit 1A and in a method of attaching the sensor unit 1A to the rim 111. In other words, the sensor unit 1A is assembled into the rim 111 instead of the sensor unit 16 according to the first to fourth embodiments. The same elements as those in the first to fourth embodiments are designated with the same references and a duplicated description will be omitted. The sensor body 1 of the sensor unit 1A has the same structure as the sensor body 16a of the sensor 16 mentioned earlier.

As shown in FIG. 12A, the sensor unit 1A according to the fifth embodiment is fixed to a vehicle wheel 110D in a method similar to that disclosed, for example, in JP 2006-56356. The sensor unit 1A includes the sensor body 1 and a base 3 which is adhered to and fixed to through an adhesive layer 5 an outer circumferential surface 111d of the rim at location more outwardly from the vertical wall 114 in the width direction of the vehicle wheel 110D. The sensor body 1 includes a case 1a made of plastic or the like in a shape of rectangular parallel-epiped box, the pressure sensor 24, the temperature sensor 26, the transmission antenna 32, the receiving antenna 34, etc (see FIG. 5).

The sensor body 1 has a slide channel 2 having a predetermined width at a lower surface of the case 1a. The slide channel 2 has one end 2a which is open at one end surface 1a1, and the other end 2b which is close to have a predetermined sliding span.

The base 3 is made of plastic or the like in a shape of a plate and has a protruding rail 4 is formed with the predetermined width thereon. The protruding rail 4 has a dimension in a longitudinal direction which is slightly shorter than a dimension of the base 3 in the longitudinal direction. One end 4a of the protruding rail 4 is flush with an end surface 3a of the base 3, and the other end 4b is slightly inward from the other end surface 3b.

The adhesive layer 5 is formed in a sheet in which a thermosetting adhesive is coated on both surfaces of a base member (not shown). As the thermosetting adhesive layer 5 Structural bonding tape (trade mark) manufactured by 3M Japan having a thermosetting acrylic adhesive is coated as lamination on both surfaces of a thermosetting acrylic foam base member. Structural bonding tape provides a usual workability and adhesiveness before heating which are similar to usual pressure sensitive adhesive tape and an extremely high final adhesiveness after heating.

In process of assembling the sensor unit 1A, first, one of the surfaces of the adhesive layers 5 is stuck on a lower surface of the base 3. Next, the other surface of the adhesive layer 5 is stuck on the outer circumferential surface 111d of the well 111c formed in the rim 111 of the vehicle wheel 110D. In a status in which the base 3 is adhered on the vehicle wheel 110C, the adhesive layers 5 are hardened under a predetermined heating condition. After hardening the adhesive layer 5, the sensor body 1 is assembled into the base 3.

In assembling the sensor body 1 into the base 3, in a status where the other end 4b of the protruding rail 4 faces one end 2a of the sensor body 1, the sensor body 1 is moved in a direction indicated by an arrow in FIG. 12A. Thus, the sensor body 1 slides on the base 3 with the slide channel 2 being guided by the protruding rail 4. When the other end 2b of the slide channel 2 hits the other end 4b of the protruding rail 4, the sliding operation of the sensor body 1 is limited at a predetermined position on the base 3.

In the fifth embodiment, the slide channel 2 and the protruding rail 4 are dovetail slide channel and rail having trapezoids with wider upward sides in cross sections. Further, a stopper (not shown) is preferably provided to prevent the sensor body 1 from falling out from the base 3 when the vehicle highly accelerated or decelerated. The stopper can be selected from various types of stoppers such as a screw cramping the sensor body 1 on the base 3, and a dovetail channel and protrusion for fitting the sensor body 1 into base 3.

Instead of the sensor unit 1A, a sensor unit disclosed in FIG. 5 of U.S. Pat. No. 7,328,608 can be used, the disclosure of which is herein incorporated by reference in its entirety.

As mentioned above, the sensor unit 1A is fixed to the well 111 of the vehicle wheel 110D instead of the sensor unit 16, and the sensor unit 1A and the sub air chamber members 113A are disposed in the circumferential direction of the vehicle wheel 110D as shown in FIG. 6 or FIG. 10 to cancel out the unbalanced mass distributions in the circumferential direction of the vehicle wheel 110D each other. This eliminates the necessity of a counter weight to the sensor unit 16 as a discrete member, so that a weight of the vehicle wheel with the sensor unit and the sub air chamber member.

Sixth Embodiment

Figure 13A:
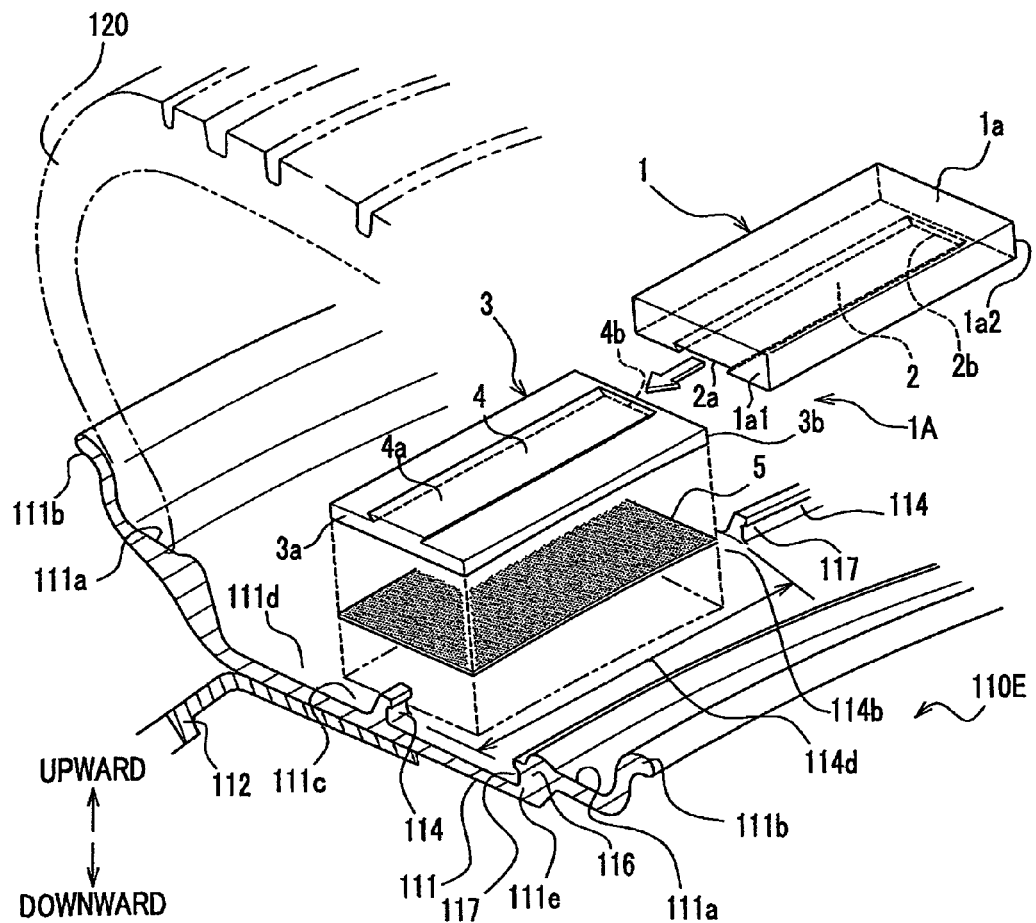
FIG. 13A is an exploded perspective view showing a status before the sensor unit is mounted in the wheel according to a sixth embodiment.
Figure 13B:
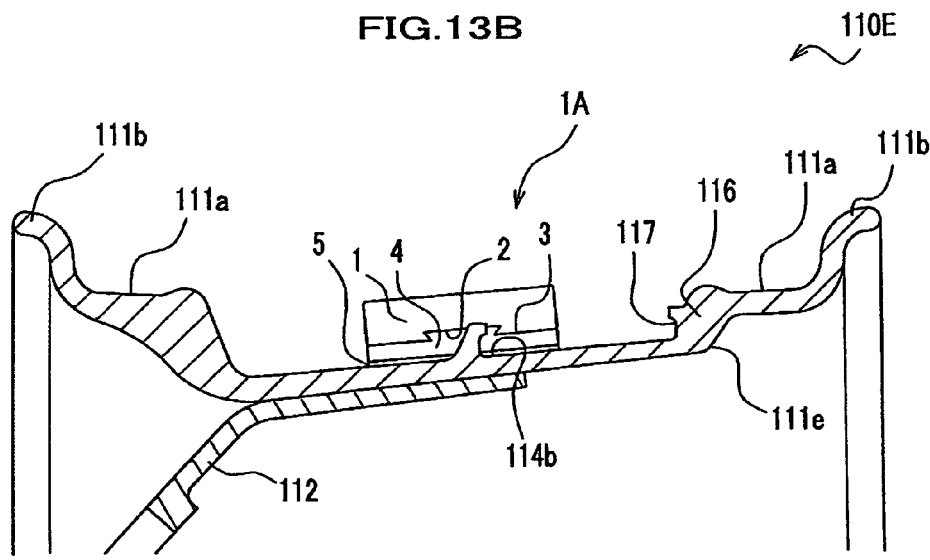
FIG. 13B is a cross section view of the wheel after the sensor unit is fixed thereto.

With reference to FIGS. 13A and 13B (occasionally FIGS. 6 and 10) will be described a sixth embodiment.

FIG. 13A is an exploded perspective view showing a status where the sensor unit is attached to the vehicle wheel according to the sixth embodiment.

In the fifth embodiment, the sensor unit 1A is fixed to the well 111c at a location outward from the vertical wall 114 of the vehicle wheel 110D in the width direction of the vehicle wheel 110D. In the vehicle wheel 110E according to the sixth embodiment, the vertical wall 114 is notched as a notched part 114d to have a fixing part (notched part) 114b to which the sensor unit 1A is fixed.

Although the vertical wall 114 is notched to provide the fixing part 114b for fixing the sensor unit 1A to the outer circumferential surface 111d, there is no trouble because the fixing part is located at the region $R_{NSC}$ where the sub air chamber member 113A (see FIGS. 6 and 10) is disposed. Further, if the sensor unit 1A has a greater mass than one sub air chamber member 113A, positively notching the vertical wall 114 and the vicinity of the vertical wall 114 where the sensor unit 1A is fixed enables the angle $\theta_1$ to be 90° in allocation of the sub air chamber SC where three sub air chamber members 113A are disposed as shown in FIG. 6. Further, a distance between the sensor unit 1A and the sub air chamber members 113A in the circumferential direction of the vehicle wheel can be shortened, which improves a dynamic balance of the vehicle wheel 110E.

The process of notching a part, in the circumferential direction, of the vertical wall 114 to improve symmetry in the circumferential direction of the vehicle wheel in allocation of the sub air chambers SC is also applicable to the first to fifth embodiments.

Seventh Embodiment

Figure 14:
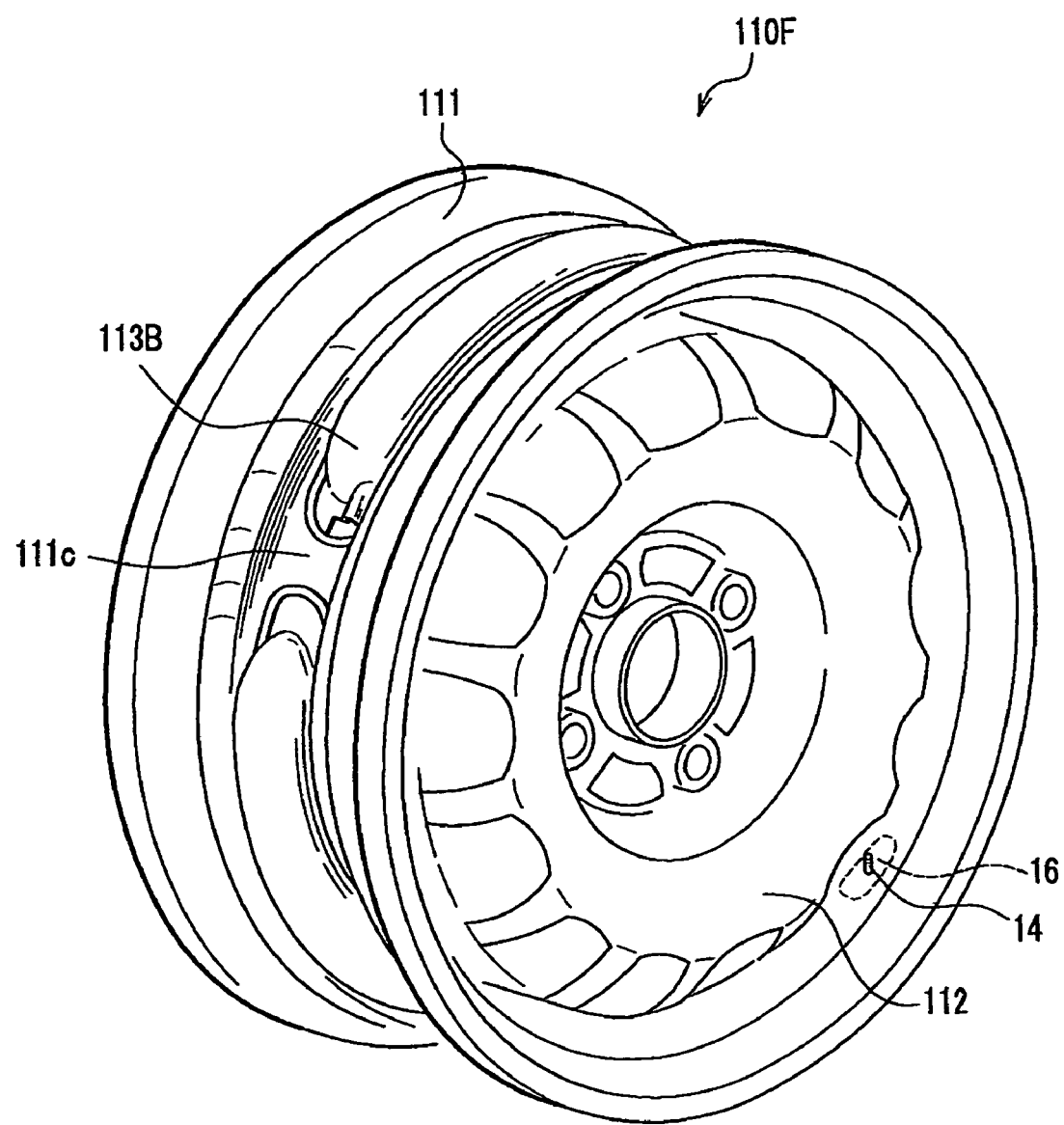
FIG. 14 is a perspective view of the wheel according to a seventh embodiment of the present invention.
Figure 15A:
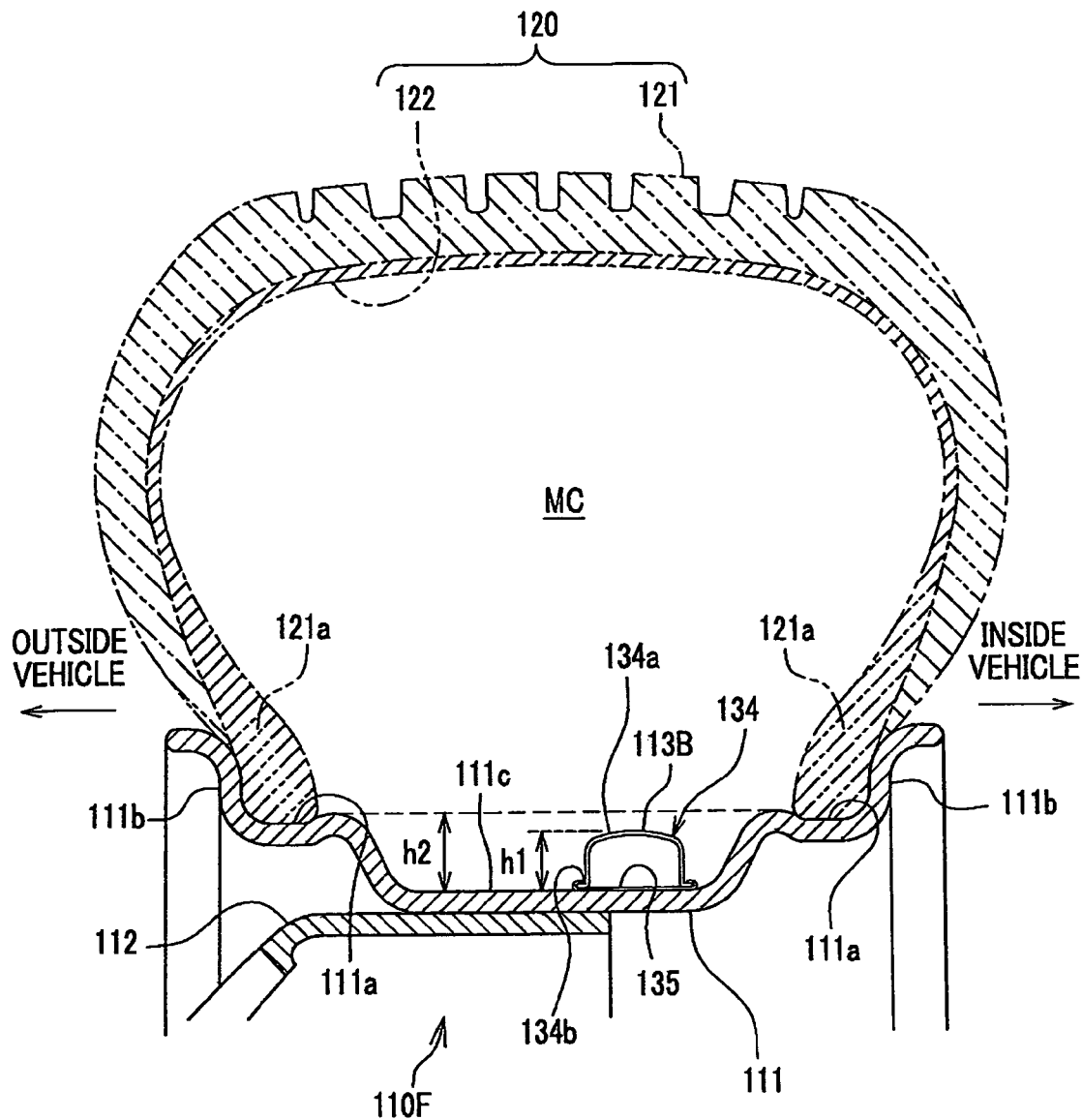
FIG. 15A is a cross section front view of a main part of the vehicle wheel shown in FIG. 14 on which a tire is set, and a sub air chamber member according to the first embodiment of the present invention is disposed.
Figure 15B:
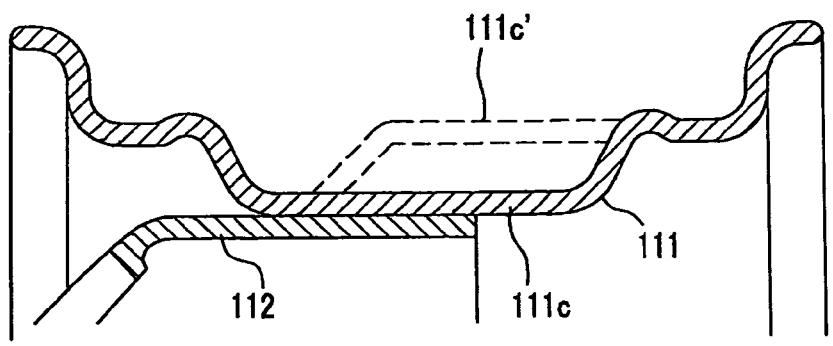
FIG. 15B is a cross section view of the wheel to which the sensor unit is fixed and partially shows a conventional part for comparison.
Figure 16:
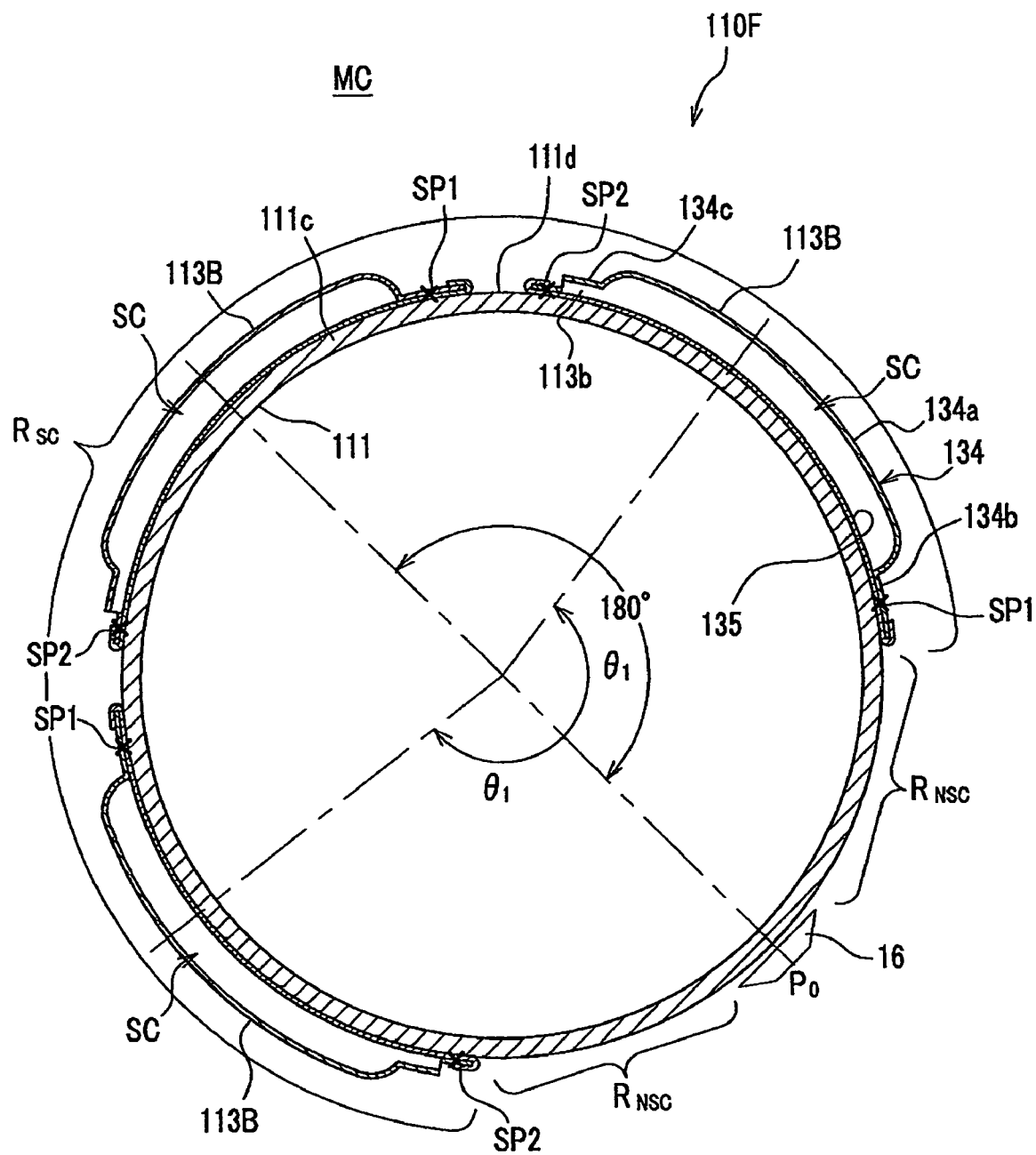
FIG. 16 is a side cross-sectional view of the vehicle wheel according to the sixth embodiment to show locations of the sensor unit and the sub air pressure chamber members.

With reference to FIGS. 14 to 16 will be described a vehicle wheel of a seventh embodiment. FIG. 14 is a perspective view of the vehicle wheel 110F of the seventh embodiment. FIG. 15A is a cross section view of a main part of the wheel 111F on which the tire 120 is put, and FIG. 15B is a cross section view of the rim 111 with an indication of a position of a conventional rim which is considered by the Inventors.

In the vehicle wheel 110F according to the seventh embodiment includes sub air chamber members (Helmholtz resonator) 113B in which the sensor unit (air pressure sensor) and two parts including a box and a bottom plate, are caulked.

Will be described structures of the sensor unit 16 and the sub air chamber members 113 after the entire structure of the vehicle wheel 110F is described. The same parts the same as the first to sixth embodiments are designated with the same references, and the duplicated description will be omitted.

As shown in FIG. 14, the vehicle wheel 110F includes a rim 111, a disk 112, a sub air chamber member 113B fixed to the well 111c of the rim 111 in which the sensor unit 16 is fixed to the vicinity of the valve 14.

The well 111c has a dimension in the width direction of the vehicle wheel 110F which is made as wider as possible within from locations of the bead seats 111a in a radial direction of the vehicle wheel 110F. This lightens the rim 111 in weight. More specifically, as shown in FIG. 15B, the well 111c is formed more inward in the radial direction of the vehicle wheel 110F than a conventional well part 111c' indicated with broken lines. Thus, the circumferential length of the well 111c is shortened, which lightens the weight of the rim 111.

With reference to FIG. 16 will be described the sub air chamber member 113B. FIG. 16 is a side section view of the vehicle wheel 110F to show an arrangement of the sensor unit 16 and the sub air chamber members 113B.

As shown in FIG. 16, the sub air chambers 113B are members which are long only in one direction and are disposed along a circumferential direction of the vehicle wheel on the outer circumferential surface 111d of the well 111c. The sub air chambers 113B are disposed on the outer circumferential surface 111d of the well 111c as follows:

Two sub air chambers 113B are disposed at the same angle $\theta_1$ in clockwise and counter clockwise direction from a position $P_0$ in a circumferential direction of the vehicle wheel 110F as a reference point where the sensor unit 16 is disposed (at a location where the valve 14 is disposed) about a wheel center axis. A third sub air chamber 113B is disposed so as to locate a center of the sub air chamber member 113B in the circumferential direction of the vehicle wheel 110F at a location 180° apart from the position $P_0$. The sub air chambers 113B are spot-welded on the outer circumferential surface 111d of the well 111c at fixing locations SP1 and SP2 mentioned later.

The angle $\theta_1$ is determined such that an unbalance mass distribution of the vehicle wheel 110F in the circumferential direction of the vehicle wheel 110F caused by disposing the sensor unit 16 at a location of the valve 14 is cancelled out by another unbalance mass distribution of the vehicle wheel 110F in the circumferential direction caused by disposing three sub air chamber members 113B to have a static balance in the vehicle wheel 110F.

A region $R_{SC}$ indicates a region in the circumferential direction of the vehicle wheel 110F where the sub air chamber members 113B are disposed. Regions $R_{NSC}$ indicate regions in the circumferential direction of the vehicle wheel 110F where the sub air chamber members 113B are not disposed.

As shown in FIG. 15A, the sub air chamber member 113B is arranged on the well 111c, the location of which is apart from the wheel disk plane of the disk 112. This arrangement reduces a possibility in contact between the sub air chamber member 113B and a tool (not shown) such as a lever inserted from a side of the wheel disk during putting the tire 120 on the rim 111.

As shown in FIG. 16, the sub air chamber members 113B are curved in the longitudinal direction thereof along the outer circumferential surface 111d of the well 111c. The sub air chamber members 113B comprise a box 134 and a bottom plate 135.

The box 134 and the bottom plate 135 are formed by a press process on plate materials.

As shown in FIGS. 15A and 16, the box 134 includes a swell 134a and an edge part 134b formed around the swell 134a forming the sub air chamber SC between the box 134 and the bottom plate 135. The bottom plate 135 has an area for caulking around the entire of the circumferential edge. The area for caulking is folded toward the edge 134b of the box 134.

As shown in FIG. 16, the box 134 includes a communication part 134c at one end thereof in a longitudinal direction thereof. The communication part 134c is provided by forming a part of the edge part 134b in a half pipe. Between the communication part 134c and the bottom plate 135, the communication through hole 113b is formed for communication between the sub air chamber SC and the outside of the sub air chamber member 113B (tire air chamber MC). A length of the communication through hole 113b is determined by L (m) in Eq. (1).

Instead of caulking, a sealing material may be applied to the contact surfaces of the box 134 and the bottom plate 135. As the sealing material, an elastic material such as silicone rubber and a thin layer material such as an adhesive or a viscosifier can be used. Such a sealing material can more securely keep air tightness of the sub air chamber SC.

A shape of the sub air chamber SC formed with the box 134 and the bottom plate 135 is not limited. However, preferably the shape in cross section is flat rectangular (low height) or a semi oval.

The flat rectangular includes a substantially rectangular shape having a top swelling part (opposite to the bottom plate 135), an inversed U shape rectangular.

The sub air chamber member 113B having the sub air chamber SC having a flat (low height) cross section allows the sub air chamber members 113B to have a low height h1 thereof. This reduces a possibility of contact between a tool such as a lever (not shown) or the tire 120 (such as the bead part 121a) and the sub air chamber members 113B during putting the tire 120 on the rim 111.

The height h1 of the sub air chamber 113B is preferably lower than a height h2 of the bead seats 111a.

A volume of the sub air chamber SC is preferably from 50 to 100 cc. The volume of the sub air chamber SC determined within the range provides a sufficient noise suppressing without increase in weight, with a result that the vehicle wheel 110F is lightened.

The length of communication through hole 113b and a cross section area of the communication through hole 113b are determined to satisfy Eq. (1) for determining the resonance frequency of the Helmholtz resonator.

A thickness of plates of the box 134 is greater than that of the bottom plate 135. As a plate material used for the sub air chamber members 113B (box 134 and the bottom plate 135), a general metal plate is favorably used such as iron, aluminum, and stain less steel. If the plate material is a metal that easily rusts, preferably, a surface process is previously applied such as painting or plating. Among the plate materials which are easily to rust, galvanized steel sheets are preferable.

Next, will be described operation of the vehicle wheel 110F.

The vehicle wheel 110F can be manufactured by previously fixing the sub air chamber member 113B having the sub air chambers SC to the rim 111 (well 111c) unlike the sub air chambers which are formed by successively connecting a plurality of partition walls or lid members precisely, and connected member is assembled into a rim of the prior art vehicle wheel disclosed by JP 2004-90669 A.

Further, in the vehicle wheel 110F, the sub air chamber member 113B can be checked or corrected in the resonance frequency solely before, the sub air chamber members 113B are fixed to the rim 111, which reduces the number of default products.

Accordingly, in the vehicle wheel 110F, the number of processes and a manufacturing cost can be decreased as compared with the conventional vehicle wheels, which increases a mass productivity.

Further, in the vehicle wheel 110F, it is possible to form the swelling part 134a and the communication part 134 which will serve as the communication through hole 113b integrally by press molding, so that the sub air chamber members 113B can be easily and precisely manufactured with the sub air chamber member 113B satisfying the relation defined by Eq. (1).

Further, according to the seventh embodiment, an unbalance mass distribution of the vehicle wheel 110F in the circumferential direction of the vehicle wheel 110F caused by disposing the body 16a of the sensor unit 16 at the location of the valve 14 is cancelled out by another unbalance mass distribution of the vehicle wheel 110F in the circumferential direction caused by disposing sub air chamber members 113B, which eliminates the necessity of discretely providing a counter weight against the sensor unit 16.

The seventh embodiment may be modified as follows:

Eighth Embodiment

Figure 17:
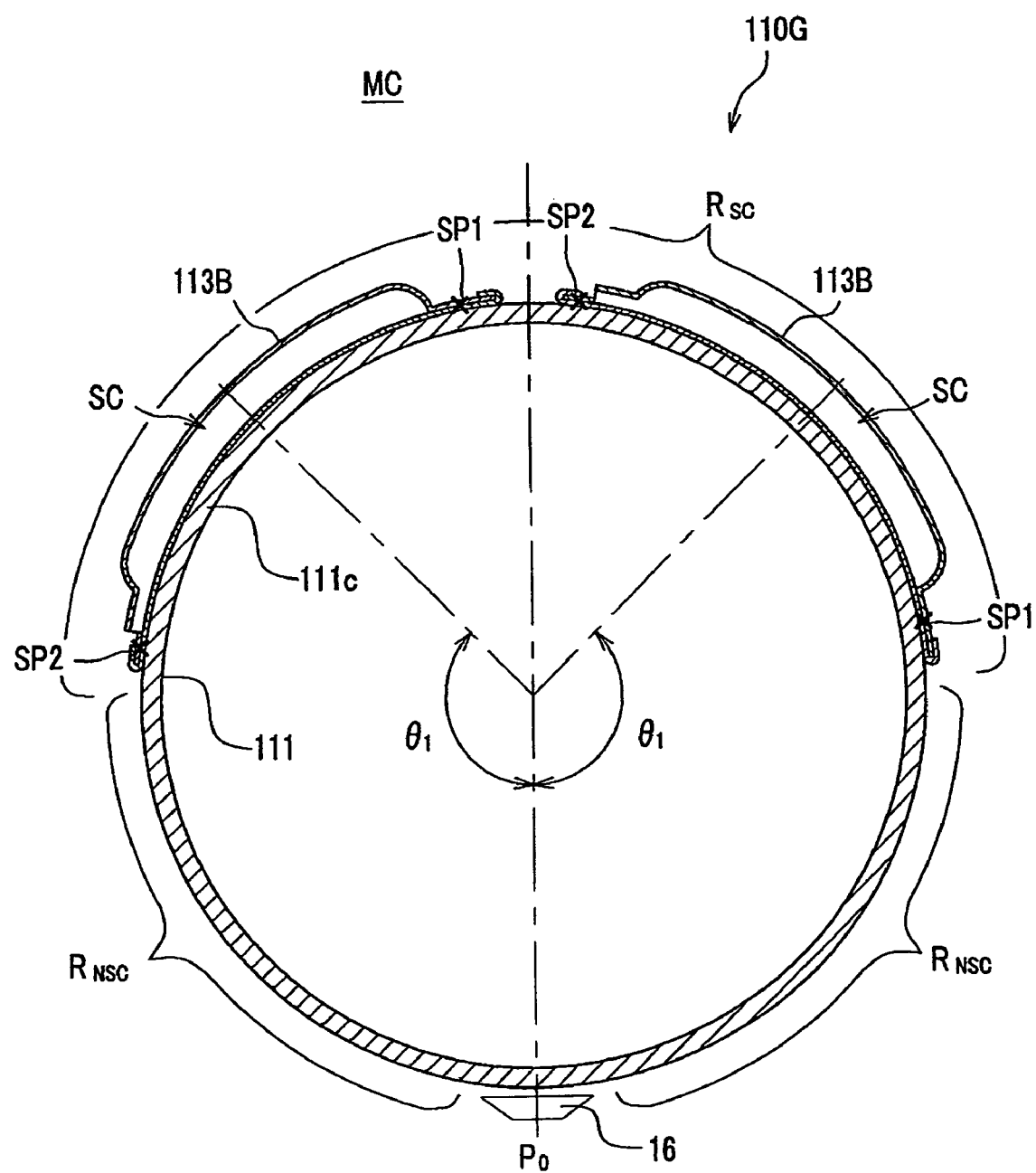
FIG. 17 is a side cross-sectional view of the vehicle wheel according to an eighth embodiment to show locations of the sensor unit and the sub air chamber members which are modified.

With reference to FIG. 17 will be described an eighth embodiment in which the same elements as those in the seventh embodiment are designated with like references, and a duplicated description will be omitted.

In the eighth embodiment, three sub air chamber members 113B are disposed along the outer circumferential surface 111d of the well 111c. However, the number of the sub air chambers may be four or more or less than three. FIG. 17 is a side cross-sectional view of the vehicle wheel of the eighth embodiment in which arrangement of a sensor unit and the sub air chamber members are modified.

In the vehicle wheel 110G shown in FIG. 17, two sub air chambers 113B are disposed that centers, in the circumferential direction of the vehicle wheel 110G, of the sub air chamber members 113B are disposed at the same angle $\theta_1$ in clockwise and counter clockwise directions from a position $P_0$ as a reference point where the sensor unit 16 is disposed about a wheel center axis.

The angle $\theta_1$ is determined such that an unbalance mass distribution caused by disposing the sensor unit 16 at the location of the valve 14 is cancelled out by another unbalance mass distribution in the circumferential direction caused by disposing two sub air chamber members 113A. In FIG. 17, the region $R_{SC}$ indicates a region in the circumferential direction of the vehicle wheel 110G where the sub air chamber members 113B are disposed. Regions $R_{NSC}$ indicate regions in the circumferential direction of the vehicle wheel 110G where the sub air chamber members 113B are not disposed.

In the eighth embodiment, the sub air chamber members 113B are disposed on a side apart from a plane (wheel disk plane) of the disk 112 (a side opposite to the wheel disk plane). In this structure, when the tire 120 is put on the rim 111, the sub air chamber members 113B can be disposed any location on the well 111c in the wheel width direction.

However, in the case where the valve 14 is disposed integrally with the sensor unit 16, it is favorable that the location is near the wheel disc plane in dynamic balance of the vehicle wheel 110F.

Further, in the third embodiment, in fixing the sub air chamber members 113B to the well 111c, fixing parts SP1 and SP2 of the sub air chamber members 113B are respectively spot-welded on the outer circumferential surface 111d of the well 111c. However, according to the present invention, there is no limitation in a method of fixing the sub air chamber members 113B to the outer circumferential surface 111d of the well 111c. For example, the sub air chambers 113B may be fixed by arc welding, friction stir welding, fixing by an adhesive, or fixing by a fastener.

Further, the sub air chamber members 113B can be fixed by spot-welding or fastening the fixing parts SP1 of the sub air chamber members 113B adjoining each other after overlap one on another. In this method, a length in the circumferential direction of the well 111c can be shortened by overlapping one fixing part SP1 on another fixing part SP1. Particularly, a degree of freedom in adjusting location of the sub air chamber members 113B is increased in adjusting the unbalanced mass distribution in the circumferential direction of the wheel.

In the eighth embodiment, it is intended to increase strength of the sub air chamber members 113b by making a plate thickness of the box 134 thicker than that of the bottom plate 135. However, the strength of the sub air chamber members 113B can be increased by applying a reinforcing process to the swelling part 134a.

In the eighth embodiment, the communication through hole 113b is offset to one side, in the wheel width direction, of the sub air chamber members 113B. However, the communication through hole 113b can be disposed at the center of the wheel width. In the eighth embodiment, the communication through hole 113b is formed one end in a longitudinal direction of the sub air chamber members 113B. However, the communication through hole 113b may be formed at approximately middle of the sub air chamber member 113B in the longitudinal direction thereof.

According to the seventh and eighth embodiments, an unbalance mass distribution of the vehicle wheels 110F (110G) in the circumferential direction of the vehicle wheel 110F(110G) caused by disposing the body 16a of the sensor unit 16 at the location of the valve 14 is cancelled out by another unbalance mass distribution of the vehicle wheel 110F(110G) in the circumferential direction caused by disposing sub air chamber members 113B, which eliminates the necessity of discretely providing a counter weight against the sensor unit 16. This reduces the weight of the vehicle wheel including the sensor unit and the sub air chamber members.

Further, in the vehicle wheels 110F and 110G according to the seventh and eighth embodiments, the sensor unit is not limited to the sensor unit 16. For example, the sensor unit 1A shown in FIG. 13 may be disposed and fixed instead the sensor unit 16.

The invention claimed is:

1. A wheel for a vehicle comprising:
a wheel body including a disk and a rim fixed to an outer circumference of the disk for supporting a tire for the vehicle;
an air pressure sensor unit having an air pressure sensor for detecting a pressure in an air chamber in the tire to generate a pressure signal and a transmitter for transmitting the pressure signal;
a sub air chamber member on the rim for reducing a magnitude of a resonance sound generated by an air column defined by the air chamber defined by the rim and the tire;
wherein the air pressure sensor unit and the sub air chamber member are disposed in a circumferential direction of the wheel so as to cancel out one unbalance mass distribution of the vehicle wheel in the circumferential direction of the wheel caused by disposing the air pressure sensor unit by another unbalance mass distribution of the wheel in the circumferential direction caused by disposing sub air chamber member; and wherein the sub air chamber member includes a bottom plate curved along a width direction of the wheel in which the curved bottom plate protrudes inward in a radial direction of the wheel with a predetermined spring constant, the rim includes a pair of channels, in vertical walls on a well of the rim, having openings facing each other extending in a circumferential direction of the wheel with a predetermined width corresponding to the width of the curved bottom plate, in which edges of the bottom plate are fitted into the channels, and the bottom plate expands in the width direction to generate pressure force applied to the channels to increase fixing forces when centrifugal force is generated by rotation of the wheel.

2. The wheel as claimed in claim 1, further comprising a valve, wherein the air pressure sensor unit is fixed to the valve.

3. The wheel as claimed in claim 1, wherein the rim includes a well, and the air pressure sensor unit is fixed to the well.

4. The wheel as claimed in claim 1, wherein the vertical wall has a notched part to dispose the sensor unit on a surface of the well.

5. The wheel as claimed in claim 1, wherein the sub air chamber member includes a sub air chamber therein and a pipe extending in a width direction from the sub air chamber member for communication between the sub air chamber and a tire air chamber defined by the rim and the tire, the vertical wall has a notch extending in the width direction, and the pipe is fitted into the notch to prevent the sub air chamber member from moving in the circumferential direction of the wheel.

6. The wheel as claimed in claim 1, wherein the air pressure sensor unit includes a sensor body and a base, the sensor body and the base have dovetail channel and a rail slidingly fitting in the dovetail channel to join the sensor body to the base.

* * * * *